United States Patent
Ishimaru et al.

(10) Patent No.: US 8,802,296 B2
(45) Date of Patent: Aug. 12, 2014

(54) AMORPHOUS CARBON MATERIAL FOR NEGATIVE ELECTRODE OF LITHIUM ION SECONDARY BATTERY AND NONAQUEOUS SECONDARY BATTERY COMPRISING SAME

(71) Applicant: JX Nippon Oil & Energy Corporation, Tokyo (JP)

(72) Inventors: Noriyo Ishimaru, Kanagawa (JP); Takashi Suzuki, Kanagawa (JP); Takefumi Kono, Kanagawa (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/875,820

(22) Filed: May 2, 2013

(65) Prior Publication Data

US 2013/0244117 A1    Sep. 19, 2013

Related U.S. Application Data

(63) Continuation of application No. PCT/JP2011/073951, filed on Oct. 18, 2011.

(30) Foreign Application Priority Data

Nov. 4, 2010   (JP) .................................. 2010-247756

(51) Int. Cl.
*H01M 4/133*  (2010.01)
*C01B 31/00*  (2006.01)
*C01B 31/02*  (2006.01)

(52) U.S. Cl.
USPC .................................. 429/231.8; 423/445 R

(58) Field of Classification Search
USPC .................................. 429/231.8; 423/445 R
See application file for complete search history.

(56) References Cited

U.S. PATENT DOCUMENTS 4,702,977 A * 10/1987 Hiratsuka et al. .......... 429/218.1
4,725,422 A *  2/1988 Miyabayashi et al. .... 423/445 R (Continued)

FOREIGN PATENT DOCUMENTS

JP   2000-58052   2/2000
JP   2003-92136   3/2003

(Continued)

OTHER PUBLICATIONS

Matsubara, K. et al., "Electron Spin Resonance of Natural Graphite Powder Different in grinding Method and Diameter," *TANSO*, No. 175, pp. 249-256, (1996).

(Continued)

*Primary Examiner* — Carlos Barcena
(74) *Attorney, Agent, or Firm* — Finnegan, Henderson, Farabow, Garrett & Dunner, L.L.P.

(57) ABSTRACT

Provided is an amorphous carbon material for a negative electrode of a lithium ion secondary battery. The amorphous carbon material comprises a size of a crystallite Lc(002) in c-axis direction ranging from 2.0 to 8.0 nm, the size being calculated from a (002) diffraction line of the amorphous carbon material measured by powder X-ray diffractometry; a carbon-derived spectrum appearing in a range from 3,200 to 3,400 gauss (G) in an electron spin resonance measured using X band; a relative signal intensity ratio ($I_{4.8K}/I_{40K}$) of the spectrum ranging from 2.4 to 3.5, wherein the relative signal intensity ratio is a ratio of signal intensity ($I_{4.8K}$) at temperature of 4.8 K to signal intensity ($I_{40K}$) at temperature of 40K; and a line width ($\Delta Hpp$) of the spectrum ranging from 70 to 180 gauss (G), wherein the line width is calculated from a first-order derivative spectrum at temperature of 4.8 K.

6 Claims, 1 Drawing Sheet

(56) References Cited

U.S. PATENT DOCUMENTS 4,945,014 A * 7/1990 Miyabayashi et al. ... 429/231.95
5,401,598 A * 3/1995 Miyabayashi et al. ..... 429/231.9

FOREIGN PATENT DOCUMENTS

JP          2006-66334      3/2006
JP          2009-117257     5/2009

OTHER PUBLICATIONS

Mizushima, S., "Electron Spin Resonance in Carbons (I)," *TANSO*, No. 47, pp. 30-34, (1966).

Mizushima, S., "Electron Spin Resonance in Carbons (II)," *TANSO*, No. 50, pp. 20-25, (1967).

International Search Report from Japanese Patent Office of PCT International Application No. PCT/JP2011/073951, mailed Jan. 24, 2012.

Ariyoshi, K. et al., "Twelve-Volt "Lead-Free" Accumulators consisting of LTO and LAMO: High and Low Temperature Examinations", Proceedings of the 48th Battery Symposium in Japan, 1A11, Nov. 13, 2007.

Ariyoshi, K. et al., "Cycleability on the LTO/LAMO Cells for 12 V "Lead-Free" Accumulators", Proceedings of the 76th Meeting of the Electrochemical Society of Japan, 1P29, Mar. 26, 2009.

The 117 Committee of the Japan Society for the Promotion of Sciences "Procedure for the measurements of lattice parameters and crystallite sizes of carbon materials by X-ray diffraction," Carbon, No. 221, pp. 52-60, 2006.

* cited by examiner

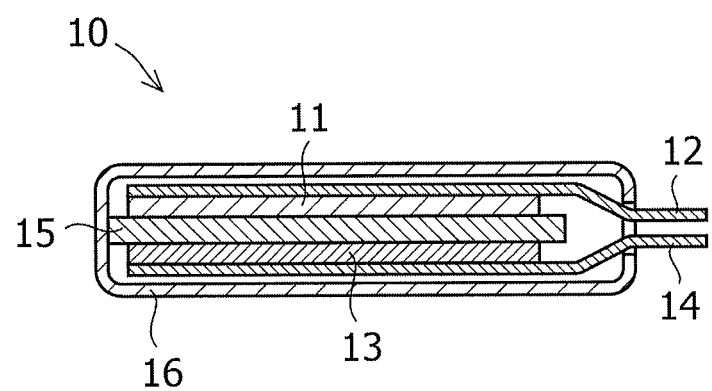

AMORPHOUS CARBON MATERIAL FOR NEGATIVE ELECTRODE OF LITHIUM ION SECONDARY BATTERY AND NONAQUEOUS SECONDARY BATTERY COMPRISING SAME

This application is a continuation of PCT/JP2011/073951, filed on Oct. 18, 2011.

BACKGROUND OF THE INVENTION

1. Field of the Invention

The present invention relates to an amorphous carbon material used for a negative electrode of a lithium ion secondary battery. More specifically, the present invention relates to an amorphous carbon material used for a negative electrode of a lithium ion secondary battery with suppressed capacity degradation and high durability, a negative electrode comprising the amorphous carbon material and a lithium ion secondary battery comprising the negative electrode.

2. Description of the Related Art

A lithium ion secondary battery is light-weighted and has high input/output characteristics compared with conventional secondary batteries such as a nickel-cadmium battery, a nickel-metal hydride battery and a lead battery. Accordingly, the lithium ion secondary battery has been expected in recent years as power supply for electric vehicles and hybrid vehicles. Typically, this kind of battery comprises a lithium-containing positive electrode enabling reversible intercalation of lithium and a negative electrode of a carbon material, the positive and negative electrodes being opposed to each other via a non-aqueous electrolyte. This kind of battery is assembled in a discharge state, and do not become a dischargeable state without be charged. The following describes the charge and discharge reactions by way of a typical conventional embodiment comprising a lithium cobaltate ($LiCoO_2$) as a positive electrode, a carbon material as a negative electrode and a non-aqueous electrolyte solution containing a lithium salt as an electrolyte.

During charge of a first cycle, lithium comprised in the positive electrode is firstly released to the electrolyte solution (Formula 1 below), so that the positive electrode potential shifts to a noble direction. At the negative electrode, lithium released from the positive electrode is absorbed by the carbon material (Formula 2 below), so that the negative electrode potential shifts to a less noble direction. Typically, when a difference between the positive electrode potential and the negative electrode potential, i.e., a battery voltage reaches a predetermined value, the charge is terminated. This value is referred to as a charge termination voltage. Then, during discharging, lithium absorbed by the negative electrode is released, so that the negative electrode potential shifts to a noble direction, and the lithium is absorbed again by the positive electrode, so that the positive electrode potential shifts to a less noble direction. Similarly to the charging, discharge also is terminated when a difference between the positive electrode potential and the negative electrode potential, i.e., a battery voltage reaches a predetermined value. That value is called a discharge termination voltage. The whole reaction formula of such charge and discharge is shown in the Formula 3 below. In the following second cycle or later, the charge and discharge reactions (cycles) progress as lithium moves between the positive electrode and the negative electrode.

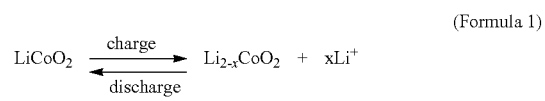

$$LiCoO_2 \underset{discharge}{\overset{charge}{\rightleftarrows}} Li_{2-x}CoO_2 + xLi^+ \quad \text{(Formula 1)}$$

$$C + xLi^+ \underset{discharge}{\overset{charge}{\rightleftarrows}} Li_xC \quad \text{(Formula 2)}$$

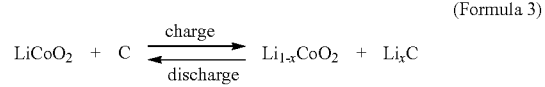

$$LiCoO_2 + C \underset{discharge}{\overset{charge}{\rightleftarrows}} Li_{1-x}CoO_2 + Li_xC \quad \text{(Formula 3)}$$

In general, a carbon material used for a negative electrode material of a lithium ion secondary battery is broadly divided into a graphite material and an amorphous material. The amorphous carbon material has an advantage of having higher output characteristics than the graphite carbon material so that the amorphous carbon material is used in a lithium ion secondary battery for vehicles and electric power storage infrastructure. The higher output characteristics are required, for example, for vehicles at the time of start from a stopped state and for electric power storage infrastructure at the time of leveling a sudden load fluctuation.

As stated above, this kind of battery has been examined actively for the use as electric storage devices for vehicles, industry, and electric power supply infrastructure in recent years. When the battery is used for these applications, these applications require extremely high degree of reliability compared with the applications for mobile phones or laptop computers. The term "reliability" is a property related to product life, referring to a property of hardly changing (hardly deteriorating) in charge/discharge capacity and internal resistance when the battery is subjected to repeated charge/discharge cycles, when it is stored while being charged to be a predetermined voltage, or when it is charged (floating charged) continuously at a constant voltage.

Incidentally, it is generally known that a lithium-ion secondary battery conventionally used for mobile phones and laptops has life characteristics greatly depending on the negative electrode material as well. One of the reasons is that it is impossible in principle to make the charge/discharge efficiency identical between the positive electrode reaction (Formula 1) and the negative electrode reaction (Formula 2). The charge/discharge efficiency is lower at the negative electrode. The charge/discharge efficiency refers to a ratio of dischargeable electric capacity to the electric capacity consumed by charging. The following is a detailed description on reaction mechanism to degrade the life characteristics due to such low charge/discharge efficiency of the negative electrode reaction.

During charging, lithium is released from the positive electrode (Formula 1) and is absorbed by the negative electrode (Formula 2) as stated above, where the reactions at the positive electrode and the negative electrode consume the same amount of electric capacity during charging. The charge/discharge efficiency, however, is lower at the negative electrode, so that during the subsequent discharging reaction, the discharge is terminated in the state where the amount of lithium released from the negative electrode is less than the amount of lithium that can be absorbed on the positive electrode side, i.e., the amount of lithium that has been absorbed before the charge on the positive electrode side. This is because a part of the electric capacity consumed by charge at the negative electrode is consumed by a side and/or competitive reaction, but not by the reaction of absorbing lithium, i.e., the absorbing reaction as dischargeable capacity.

As a result of such charge/discharge reactions, the positive electrode potential at the discharge termination state shifts to a nobler direction than the original potential before the charge/discharge, and the negative electrode potential also shifts to a nobler direction than the original potential before the charge/discharge. This results from the following reason. All of lithium which has been released during the charge of the positive electrode, cannot be absorbed (not return to) during discharging. Thus, during discharging when the potential shifted to a noble direction during charging is shifted to a less noble direction, the potential cannot return to the original positive electrode potential by an amount corresponding to a difference in charge/discharge efficiency between the positive/negative electrodes. Then discharge is terminated at a nobler potential than the original positive electrode potential. As stated above, since the discharge of a lithium ion secondary battery ends when the battery voltage (i.e., a difference between the positive electrode potential and the negative electrode potential) reaches a predetermined value (discharge termination voltage), a nobler potential at the positive electrode at the time of discharge termination means that the negative electrode potential shifts accordingly to a noble direction.

As stated above, during the repeated charge/discharge cycles, this kind of battery generates a problem of a reduction in capacity obtainable within a predetermined voltage range (within the range between the discharge termination voltage and the charge termination voltage) owing to a change of an operation range of the capacity of the positive/negative electrodes. Such reaction mechanism of the capacity degradation has been also reported in academic conferences and others (e.g., Proceedings of the 48th Battery Symposium in Japan, 1A11 (Nov. 13, 2007) and Proceedings of the 76th Meeting of the Electrochemical Society of Japan, 1P29 (Mar. 26, 2009)).

Electron Spin Resonance (ESR) studies on carbon have been reported (Tanso 1966, No. 47, 30 to 34; Tanso 1967, No. 50, 20 to 25; and Tanso 1996, No. 175, 249 to 256).

SUMMARY OF THE INVENTION

The low charge/discharge efficiency at the negative electrode results from a part of the electric capacity consumed by charge at the negative electrode being consumed by a side and/or competitive reaction and not by the reaction of absorbing lithium as stated above. Such a side and/or competitive reaction mainly result from a decomposition reaction of electrolyte solution at edge faces of the laminated planar hexagonal networks which are exposed on particle surfaces of a carbon material.

In general, there are, at the edge faces of the laminated planar hexagonal networks, a large number of dangling bonds, that is, many localized electrons which are valence electron bonds being not saturated and being present without a bonding partner. On a surface of a negative electrode carbon material during charge, that is, at the interface where an electrolyte solution comes into contact with the carbon material, a side and/or competitive reaction occurs because the localized electrons catalytically act to cause reduction decomposition of the electrolyte solution in addition to the intended charging reaction of inserting lithium into layers of planar hexagonal networks, thus decreasing the charge/discharge efficiency of the negative electrode.

Such a side and/or competitive reaction at the negative electrode generate a reaction product, which is a solid insoluble in the electrolyte solution at room temperatures. Then, as the charge/discharge cycle progresses, the particle surfaces of the negative electrode will be coated with such a reaction product, and the coating film grows (accumulates) thick. This coating film becomes a resistive component in the reversible intercalation reaction of Li ions, so that the growth of the coating film increases internal resistance of the battery. Since the coating film is apt to be formed and grow at the edge face of the laminated planar hexagonal networks on the particle surfaces as the gate to let Li ions in and out, as the charge/discharge cycle progresses, internal resistance of the battery increases, and the apparent battery capacity obtained with predetermined current also deteriorates as the charge/discharge cycle progresses.

In this way, capacity degradation of a lithium ion secondary battery during repeated charge/discharge cycles results from the two factors: (1) a change of an operation range for the capacity of the positive/negative electrodes due to a side and/or competitive reaction at the negative electrode, and (2) continuous increase in internal resistance of the battery due to such a change. An amorphous carbon material of negative electrode is then required to have a function to suppress the side and/or the competitive reaction at the negative electrode and to suppress the growth of coating film as the charge/discharge cycle progresses.

In order to suppress the capacity degradation of lithium ion secondary battery during repeated charge/discharge cycles, it is an object of the present invention to develop an amorphous carbon material for a negative electrode that can suppress the capacity degradation due to repeated charge/discharge cycles, and to provide a material for a negative electrode of lithium ion secondary battery for applications requiring high-degree of reliability, such as vehicles, industry and electric power storage infrastructure.

In order to fulfill the object, in a first aspect of the present invention, provided is an amorphous carbon material for a negative electrode of a lithium ion secondary battery containing a non-aqueous electrolyte, the material comprising a size of a crystallite Lc(002) in c-axis direction ranging from 2.0 to 8.0 nm, the size being calculated from a (002) diffraction line of the amorphous carbon material measured by powder X-ray diffractometry; a carbon-derived spectrum appearing in a range from 3,200 to 3,400 gauss (G) in an electron spin resonance measured using X band; a relative signal intensity ratio ($I_{4.8K}/I_{40K}$) of the spectrum ranging from 2.4 to 3.5, wherein the relative signal intensity ratio is a ratio of signal intensity ($I_{4.8K}$) at temperature of 4.8 K to signal intensity ($I_{40K}$) at temperature of 40K; and a line width ($\Delta Hpp$) of the spectrum ranging from 70 to 180 gauss (G), wherein the line width is calculated from a first-order derivative of the spectrum at temperature of 4.8 K.

In order to fulfill the object, a second aspect of the present invention provides the amorphous carbon material for a negative electrode of a lithium ion secondary battery, the material having been produced by a method comprising a step of coking a stock oil composition by delayed coking process, and a subsequent step of heating, wherein the stock oil composition has normal paraffin content of 5 to 20% by weight and has an aromatic index fa represented by Equation 1 below in a range of 0.3 to 0.65:

$$fa = 3.65 \times D - 0.00048H - 2.969 \quad \text{(Equation 1)}$$

wherein $H = 875 \times [\log \{\log(V+0.85)\}]$, D denotes density of stock oil (g/cm$^3$), and V denotes viscosity of stock oil (mm$^2$/sec.).

In order to fulfill the aforementioned object, a third aspect of the present invention provides a lithium ion secondary battery comprising the amorphous carbon material as a negative electrode material.

A lithium ion secondary battery comprising a negative electrode of the amorphous carbon material of the present invention can achieve a high-degree of life characteristic.

BRIEF DESCRIPTION OF THE DRAWINGS

FIG. 1 schematically shows a cross-section of a cell used for battery evaluation examinations in the present examples.

DESCRIPTION OF THE PREFERRED EMBODIMENTS

It should be noted that the entire contents of Japanese Patent Application No. 2010-247756, filed on Nov. 4, 2010, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

An amorphous carbon material having physical properties recited in a first aspect of the present invention has a feature of suppressing the side and/or competitive reaction at the negative electrode and suppressing the growth of coating film as the charge/discharge cycle progresses.

Firstly, the side and/or competitive reaction at the negative electrode are mainly a decomposition reaction of electrolyte solution as stated above. The decomposition reaction of electrolyte solution progresses while letting the localized electrons function as a catalyst, the localized electrons being present at edge faces of the laminated planar hexagonal networks that are exposed on particle surfaces of the negative electrode. Thus, in order to suppress the decomposition reaction of the electrolyte solution, fewer edge faces that are exposed on the surface are preferable.

The growth of coating film due to the progress of charge/discharge cycles tends to concentrate at a part where edge faces that are exposed on the particle surfaces of the negative electrode are aligned. This means that very thick coating is formed locally at the edge face in an aligned state. A negative electrode of such an amorphous carbon material has an increased amount of a resistive component in the reversible intercalation reaction of Li ions at the negative electrode, thereby unpreferably increasing the internal resistance of the battery. Thus, in order to thin the coating film formed by a reaction product, the decomposition reaction of the electrolyte solution preferably occurs in a dispersing manner, and to this end, two or more of edge face states exposed on the particle surfaces are preferably present.

That is, in the first aspect of the present invention, an amorphous carbon material has fewer edge faces exposed on the particle surfaces and has two or more of edge face states. A lithium ion secondary battery comprising a negative electrode of such an amorphous carbon material can achieve a high-degree of life characteristics.

The amorphous carbon material in the first aspect of the present invention comprises a size of a crystallite Lc (002) in c-axis direction ranging from 2.0 to 8.0 nm, the size being calculated from a (002) diffraction line of the amorphous carbon material measured by powder X-ray diffractometry; a carbon-derived spectrum appearing in the range from 3,200 to 3,400 gauss (G) in an electron spin resonance (ESR) measured using X band; a relative signal intensity ratio ($I_{4.8K}/I_{40K}$) of the spectrum ranging from 2.4 to 3.5, wherein the relative signal intensity ratio is a ratio of signal intensity ($I_{4.8K}$) at temperature of 4.8 K to signal intensity ($I_{40K}$) at temperature of 40K; and a line width ($\Delta$Hpp) of the spectrum ranging from 70 to 180 gauss (G), the line width being calculated from a first-order derivative spectrum at temperature of 4.8 K.

Such an amorphous carbon material can be said to have fewer edge faces exposed on the particle surfaces, and two or more of edge face states. A lithium ion secondary battery comprising such an amorphous carbon material suppresses a decomposition reaction of electrolyte solution at the negative electrode so that a difference hardly occurs at the operation range of the positive and negative electrodes. Formation of coating film at the edge faces also is suppressed so that a resistive component in the reversible intercalation reaction of Li ions hardly increases. Such a lithium ion secondary battery can secure high-degree storage characteristics.

A relative amount and the number of states of edge faces exposed on the particle surfaces of an amorphous carbon material can be understood by a relative signal intensity ratio ($I_{4.8K}/I_{40K}$) and the line width $\Delta$Hpp, which are obtainable from the ESR spectrum.

Firstly, the amount of edge faces exposed on the particle surfaces can be relatively obtained based on the magnitude of a relative signal intensity ratio ($I_{4.8K}/I_{40K}$) that is a ratio of signal intensity ($I_{4.8K}$) of a carbon-derived spectrum measured at temperature of 4.8 K to signal intensity ($I_{40K}$) at temperature of 40K, the carbon-derived spectrum appearing in the range from 3,200 to 3,400 gauss (G). Then, the number of states of edge faces exposed on the particle surfaces can be relatively obtained based on the magnitude of the line width $\Delta$Hpp of the ESR spectrum at temperature of 4.8 K.

In this way, in the first aspect of the present invention, the ranges of the signal intensity ratio ($I_{4.8K}/I_{40K}$) and the line width $\Delta$Hpp of the ESR spectrum can be said to specify the range of physical properties of the amorphous carbon material having fewer edge faces exposed on the particle surfaces and having two or more of edge face states.

The following describes ESR measurement.

The ESR measurement is spectroanalysis of observing transition between energy levels of unpaired electrons placed in a magnetic field. The magnetic field applied to a substance having unpaired electrons causes splitting of the energy level into two due to the Zeeman effect. The measurement is performed by sweeping the magnetic field under a microwave irradiation, and a splitting difference ($\Delta$E) of the energy increases as the magnitude of the applied magnetic field increases. When $\Delta$E becomes equal to the energy of microwave irradiated, resonance absorption is observed. The ESR spectrum can be found by detecting the amount of absorption of energy at this time.

The ESR spectrum is typically obtained as a first-order derivative spectrum, where one-time integration yields an absorption spectrum, and two time integration yields signal intensity. The magnitude of the signal intensity is an index which represents the magnitude of density of unpaired electrons in the substance.

A carbon material contains two kinds of unpaired electrons, localized electrons and conduction electrons. In the ESR measurement of a carbon material, the sum of resonance absorption of microwaves by these two kinds of unpaired electrons is observed as the ESR spectrum. The signal intensity, which is obtained by twice integration of the obtained ESR spectrum, is an index which represents the magnitude of density of unpaired electrons which are the sum of the conduction electron density and the localized electron density.

The conduction electrons in a carbon material are unpaired π electrons spontaneously occurring in relation to the number of rings forming planar hexagonal networks and their bonding form, and can freely move in the planar hexagonal networks (Non-Patent Literatures 3 and 4). The localized electrons are present at edge faces of the laminated planar hexagonal networks, and do not move.

The signal intensity of resonance absorption by conduction electrons does not depend on temperature, while the signal intensity of resonance absorption by localized electrons increases inversely proportional to measurement temperature (T). For instance, the following is reported (Non-Patent Literature 5). In the ESR measurement of a carbon material in the temperature range of 4.2 K≤T≤300 K, when the measurement is performed while gradually decreasing the measurement temperature from 300 K, absorption of microwaves due to localized electrons starts to be observed at around 50 K, and the signal intensity due to localized electrons increases inversely proportional to the measurement temperature (T) in a low-temperature region of 50 K or lower.

Based on this, a ratio of signal intensity of the ESR spectra at two temperatures (4.8 K, 40 K) in a low-temperature region of 50 K or lower can be an index which relatively represents the magnitude of localized electron density. In the present invention, the relative magnitude of localized electron density which can be estimated from the ratio of signal intensity $(I_{4.8K}/I_{40K})$ is considered as an index which represents a relative amount of edge faces exposed on the particle surfaces.

The line width ΔHpp is a distance between two peaks (maximum and minimum) in the ESR spectrum (first-order derivative spectrum), which is an index which represents the state of unpaired electrons. Since an unpaired electron in a different state has a different magnitude of energy splitting ΔE due to a magnetic field, resonance absorption occurs at a different magnetic field. On the other hand, the ESR spectrum of an amorphous carbon material is a spectrum obtained by averaging absorption spectra, each having a different resonance magnetic field. This means that, when two or more of unpaired electrons in different states are present, i.e., when resonance absorptions occur two or more of times at different magnetic fields, the ESR spectrum appears to be a wider spectrum having an increased line width ΔHpp.

Especially when the ESR spectrum of an amorphous carbon material has a large line width ΔHpp in a low-temperature region where localized electrons greatly contribute, the amorphous carbon material presumably contains two or more of states of localized electrons. The presence of two or more of localized electron states means the presence of two or more of edge face states where localized electrons exist.

Accordingly, the line width ΔHpp of a first-order derivative spectrum obtained by ESR measurement at a low-temperature region of 50 K or lower can be an index that represents the quantity of the state or states of edge faces in the amorphous carbon material.

In the first aspect of the present invention, a carbon-derived spectrum appearing in the range from 3,200 to 3,400 gauss (G), has a relative signal intensity ratio $(I_{4.8K}/I_{40K})$ of 2.4 to 3.5. The relative signal intensity ratio is a ratio of signal intensity $(I_{4.8K})$ of the spectrum at temperature of 4.8 K by the ESR measurement to signal intensity $(I_{40K})$ measured at temperature of 40K.

As stated above, in the low-temperature region of the measurement temperature of 50 K or lower, localized electrons greatly contribute. In this region, signal intensity due to the localized electrons increases inversely proportional to the measurement temperature. It can be said from this that, in the low-temperature region of the measurement temperature of 50 K or lower, the greater the change of signal intensity with reference to the measurement temperature is, the higher the localized electron density is.

In the present invention, a signal intensity ratio between two points of the measurement temperatures of 4.8 K and 40 K is used as an index which represents the magnitude of localized electron density, i.e., the relative amount of edge faces exposed on the particle surfaces. These two temperatures of 4.8 K and 40 K are selected because localized electrons start to contribute at the measurement temperature of 40 K, while contribution of the localized electrons is sufficiently large at the measurement temperature of 4.8 K, so that presumably the signal intensity ratio between these two temperatures represents the most precise signal intensity ratio in the temperature region of 50 K or lower.

When the relative signal intensity ratio $(I_{4.8K}/I_{40K})$ of a carbon-derived spectrum appearing in the range from 3,200 to 3,400 gauss (G) is less than 2.4, localized electron density is very small, wherein the relative signal intensity ratio is a ratio of signal intensity $(I_{4.8K})$ of the spectrum at temperature of 4.8 K by the ESR measurement to signal intensity $(I_{40K})$ measured at temperature of 40K. Such an amorphous carbon material is in a state of having fewer edge faces exposed on the particle surfaces. A lithium ion secondary battery comprising a negative electrode made of such a material is apt to make a decomposition reaction of electrolyte solution take place concentrating on a few edge faces, allowing a reaction product to accumulate locally to form thick coating film. This results in increase of a resistive component in the reversible intercalation reaction of Li ions, thereby increasing internal resistance of the battery and unfavorably degrading life characteristics of the battery.

When the relative signal intensity ratio $(I_{4.8K}/I_{40K})$ of a carbon-derived spectrum appearing in the range from 3,200 to 3,400 gauss (G) is more than 3.5, localized electron density is very large, wherein the relative signal intensity ratio is a ratio of signal intensity $(I_{4.8K})$ of the spectrum at temperature of 4.8 K by the ESR measurement to signal intensity $(I_{40K})$ measured at temperature of 40K. Such an amorphous carbon material is in a state of having more edge faces exposed on the particle surfaces. A lithium ion secondary battery comprising a negative electrode made of such a material is apt to generate a decomposition reaction of electrolyte solution with localized electrons at the negative electrode acting as a catalyst. In such a case, since a difference in the leak currents between the positive electrode and the negative electrode increases, the operation range of the capacity of the positive and negative electrodes changes, thereby unfavorably degrading life characteristics of the battery.

As stated above, a relative signal intensity ratio $(I_{4.8K}/I_{40K})$ of a carbon-derived spectrum appearing in the range from 3,200 to 3,400 gauss (G) is limited to 2.4 to 3.5, wherein the relative signal intensity ratio is a ratio of signal intensity $(I_{4.8K})$ of the spectrum at temperature of 4.8 K by the ESR measurement to signal intensity $(I_{40}K)$ measured at temperature of 40K. An amorphous carbon material having a physical property in this range have a feature of having an appropriate quantity range of edge faces of the laminated planar hexagonal networks exposed on the particle surfaces.

In the first aspect of the present invention, the amorphous carbon material has a line width ΔHpp of 70 to 180 gauss (G) between peaks of the ESR spectrum (first-order derivative spectrum) at measurement temperature of 4.8 K, wherein the line width is obtained by the ESR measurement of the amorphous carbon material.

The line width ΔHpp of the ESR spectrum at measurement temperature of 4.8 K is an index which represents the quantity of the state or states of localized electrons. A larger line width ΔHpp means a lot of localized electron states existing (i.e., two or more of edge face states existing). On the other hand, a smaller ΔHpp means fewer localized electron states (i.e., fewer edge face states existing).

When the line width ΔHpp between peaks of the ESR spectrum (first-order derivative spectrum) by the ESR measurement of an amorphous carbon material at measurement temperature of 4.8 K is less than 70 G, fewer localized electron states in the amorphous carbon material is present, indicating that edge faces in an aligned state are exposed on the particle surfaces. In a lithium ion secondary battery comprising a negative electrode made of such an amorphous carbon material, the edge faces exposed on the particle surfaces of the negative electrode are in an aligned state, thereby allowing a decomposition reaction of electrolyte solution to take place in a concentrative manner, so that thick coating film is formed locally at the edge faces. This results in increase of a resistive component in the reversible intercalation reaction of Li ions, thereby increasing internal resistance of the battery and unfavorably degrading life characteristics of the battery.

When the line width ΔHpp between peaks of the ESR spectrum (first-order derivative spectrum) by the ESR measurement of an amorphous carbon material at measurement temperature of 4.8 K is more than 180 G, localized electron states in the amorphous carbon material is increased extremely, indicating that a crystal structure around the laminated planar hexagonal networks is disordered greatly. In a lithium ion secondary battery comprising a negative electrode made of such an amorphous carbon material, since the reversible intercalation reaction of Li ions at the negative electrode is three-dimensionally inhibited by such a greatly-disordered crystal structure, a resistive component in the reversible intercalation reaction of Li ions increases, thereby increasing internal resistance of the battery and unfavorably degrading life characteristics of the battery.

As stated above, a line width ΔHpp between peaks of the ESR spectrum (first-order derivative spectrum) at measurement temperature of 4.8 K by the ESR measurement of an amorphous carbon material is limited to 70 to 180 gauss (G). An amorphous carbon material having a physical property in this range can be in a state where two or more of localized electron states of the edge faces exposed on the particle surfaces exists appropriately.

Accordingly, an amorphous carbon material having a relative signal intensity ratio ($I_{4.8K}/I_{40K}$) of the ESR spectrum of 2.4 to 3.5, which is a ratio of signal intensity ($I_{4.8K}$) of the spectrum at temperature of 4.8 K by the ESR measurement to signal intensity ($I_{40K}$) measured at temperature of 40 K, and having a line width (ΔHpp) of 70 to 180 gauss (G) of the spectrum calculated from the first-order derivative spectrum at temperature of 4.8 K, have the features of having fewer edge faces exposed on the particle surfaces and two or more of edge face states. In a lithium ion secondary battery comprising such an amorphous carbon material, a decomposition reaction of electrolyte solution with localized electrons at the negative electrode acting as a catalyst hardly occurs, an operation range of the capacity at the positive and negative electrodes does not change, and internal resistance of the battery does not increase as the charge/discharge cycles proceed. Accordingly, a battery can secure very high reliability.

In the first aspect of the present invention, a size of a crystallite Lc (002) in c-axis direction ranges from 2.0 to 8.0 nm. The size is calculated from a (002) diffraction line measured by powder X-ray diffractometry. The reason of selecting such a size is the same as that for the conventional art.

In general, this kind of amorphous carbon material for a negative electrode of a secondary battery can be obtained by heating a carbide precursor such as an organic polymer, coal-tar pitch or petroleum pitch under an inert gas atmosphere. The heat treatment is typically at temperature ranging from about 900 to 1,500° C., and the carbon material heat-treated in this temperature range has the size Lc (002) of a crystallite in c-axis direction ranging from 2.0 to 8.0 nm.

When the heat treatment temperature is less than 900° C., although reversible capacity (maximum capacity enabling charge and discharge) as the amorphous carbon material increases, irreversible capacity during initial charge/discharge cycle unfavorably increases. Since the irreversible capacity at the negative electrode is compensated with lithium contained by the positive electrode material, the battery has to be filled in advance with a positive electrode material in the amount sufficient for compensation, thereby decreasing capacity as the battery. When the heat treatment temperature is more than 1,500° C., although irreversible capacity during initial charge/discharge cycle decreases, reversible capacity as the amorphous carbon material decreases, thereby unfavorably decreasing the charge/discharge capacity as the battery. In the first aspect of the present invention, such a range of the Lc (002) of the amorphous carbon material is applicable in the same manner as in the conventional art.

In a second aspect of the present invention, provided is a specific method for producing the amorphous carbon material described in the first aspect of the invention. That is, in the second aspect of the present invention, provided is a method for producing the amorphous carbon material of the first aspect of the present invention for a negative electrode of a lithium ion secondary battery, comprising a step of coking a stock oil composition by delayed coking process and a subsequent step of heating. The stock oil composition has normal paraffin content of 5 to 20% by weight, and has an aromatic index fa represented by the following Equation 1 in a range of 0.3 to 0.65:

$$fa = 3.65 \times D - 0.00048H - 2.969 \quad \text{(Equation 1)},$$

wherein H=875×[log {log(V+0.85)}], and D denotes density of stock oil composition (g/cm³), and V denotes viscosity of stock oil composition (mm²/sec.).

In the method of producing an amorphous carbon material for a negative electrode of a lithium ion secondary battery, "a step of coking a stock oil composition by delayed coking process, and a subsequent step of heating" is generally known. The present inventors have found that the amorphous carbon material in the first aspect of the present invention can be produced by selecting physical properties and formulations of a stock oil composition and a coking condition, and have completed the second aspect of the present invention.

The amorphous carbon material in the first aspect of the present invention has features of having fewer edge faces of laminated planar hexagonal networks exposed on the particle surfaces, and having two or more of edge face states. In the second aspect of the present invention, provided is a method for producing an amorphous carbon material having such features.

Typically, a known method for producing an amorphous carbon material comprising the steps of pulverizing and classifying of raw coke or calcined coke for particle size control, and an optional subsequent step of heating. The raw coke refers to what is obtained from heat decomposition of a stock oil composition by a delayed coker. The calcined coke refers to what is obtained from heat treatment of raw coke by an industrial furnace to remove the water content and the volatile content and to develop the crystal structure. It is impossible, however, to produce the amorphous carbon material in the first aspect of the present invention by using such a known method comprising the steps of pulverizing and classifying of raw coke or calcined coke, and a subsequent step of heating.

The present inventors have examined a method for producing an amorphous carbon material, and found that an amorphous carbon material having fewer edge faces exposed on the particle surfaces and having two or more of edge face states can be obtained by making a size (a size of an optically anisotropic region, hereinafter simply referred to as "an anisotropic region") of the planar hexagonal networks laminated in a disordered manner relatively small.

When raw coke or calcined coke to be pulverized has small anisotropic regions, mechanical energy applied to the raw coke or calcined coke is absorbed by gap regions between the small anisotropic regions. The raw coke or calcined coke containing small anisotropic regions has large gap regions between the anisotropic regions, so that the mechanical energy applied is sufficiently absorbed at the gap regions between the anisotropic regions. Accordingly, probability of breakage in the planar hexagonal networks or probability of a crack in the planar hexagonal networks can be greatly suppressed. The amount of edge faces exposed on the particle surfaces after pulverization is smaller in the case of absorbing mechanical energy at the gap regions between anisotropic regions than in the case of a crack in the planar hexagonal networks.

Such absorption of mechanical energy at gap regions between anisotropic regions disconnects carbon-carbon bonding in unorganized carbon having a structure other than a benzene ring which is a constituent unit of planar hexagonal networks, the bonding existing at the gap regions between anisotropic regions. Since two or more of bonding states exist at such carbon-carbon bonding, the disconnection thereof by the mechanical energy makes two or more of edge face states exposed on the disconnected face. Such two or more of edge face states still remain after the step of pulverizing and classifying and the subsequent step of heating.

Accordingly, pulverizing and classifying the raw coke or calcined coke having small anisotropic regions allow a state of fewer edge faces to be exposed on the particle surfaces, and two or more of edge face states to be exposed on the particle surfaces.

On the contrary, when raw coke or calcined coke having relatively large anisotropic regions and small gap regions between the anisotropic regions is pulverized, mechanical energy is not absorbed sufficiently by the gap regions between the anisotropic regions, thereby causing cracks in the anisotropic regions. When cracks are caused in the anisotropic regions where planar hexagonal networks are oriented and aligned in one direction, a large number of edge faces in an aligned state are apt to be exposed on the crack faces. A lithium ion secondary battery comprising such an amorphous carbon material is apt to form coating film of a decomposition reaction product at edge faces of the negative electrode, thereby increasing a resistive component for reversible intercalation of Li ions, increasing internal resistance of the battery, and unfavorably degrading life characteristics of the battery.

For these reasons, a preferable method for producing the amorphous carbon material having physical properties recited in the first aspect of the present invention comprises the steps of pulverizing and classifying raw coke or calcined coke containing relatively small-sized anisotropic regions, and an subsequent optional step of heating.

Accordingly, in other words, in the second aspect of the present invention, provided is a specific method for allowing raw coke or calcined coke to be pulverized to have a structure containing relatively small-sized anisotropic regions. The present inventors have found that raw coke having such a structure can be produced by delayed coking process, which is suitable for mass production, when physical properties and a coking condition of a stock oil composition as a raw material can be controlled, thus completing the second aspect of the present invention.

A stock oil composition having the aforementioned physical properties can be prepared by subjecting a single stock oil to various treatments so as to satisfy the aforementioned conditions or by blending two or more types of stock oils so as to satisfy the aforementioned conditions. Examples of the stock oils include bottom oil of fluid catalytic cracker (fluid catalytic cracking residue oil, FCC DO), bottom oil of high severity fluid catalytic cracker (high-severity fluid catalytic cracking residue oil, HS-FCC DO), an aromatic component and a saturated component extracted from fluid catalytic cracking residue oil, an aromatic component and a saturated component extracted from high-severity fluid catalytic cracking residue oil, hydrodesulfurization oil obtained by highly hydrodesulfurization of stock oil, vacuum residue oil (VR), desulfurized deasphalted oil, coal liquefaction oil, coal solvent extraction oil, atmospheric residue oil, shale oil, tar sand bitumen, naphtha tar pitch, ethylene bottom oil, coal tar pitch, heavy oil subjected to hydrorefining, light straight-run light oil, heavy straight-run light oil, hydrodesulfurization light oil, fluid catalytic light oil, direct desulfurization light oil, indirect desulfurization light oil and lubricating oil. Among them, heavy oil subjected to high-degree of hydrodesulfurization processing, comprising an appropriate saturated component and appropriate normal paraffin contained by such a component, light straight-run light oil, heavy straight-run light oil, hydrodesulfurization light oil, fluid catalytic light oil, direct desulfurization light oil, indirect desulfurization light oil and lubricating oil, are preferably used.

When these stock oils are blended to prepare a stock oil composition, the blending ratio may be appropriately adjusted according to the properties of the stock oils used. The stock oil properties may vary depending on the type of crude oil and the processing conditions employed until the stock oil is obtained from the crude oil.

The bottom oil of fluid catalytic cracker may be bottom oil of a fluidized-bed fluid catalytic cracker for obtaining high-octane FCC gasoline by using vacuum gas oil as stock oil and urging a selective decomposition reaction using a catalyst. The vacuum gas oil used as the stock oil is preferably desulfurized vacuum gas oil which is obtained by direct-desulfurization of atmospheric distillation residue oil (preferably sulfur content of 500 weight ppm or lower, density at 15° C. of 0.8 g/cm$^3$ or more).

The bottom oil of high severity fluid catalytic cracker (HS-FCC) is bottom oil of a HS-FCC capable of promoting a decomposition reaction more than the aforementioned fluid catalytic cracker. In the HS-FCC, a catalyst and a stock oil are brought into contact in a down-flow type reactor which allows them to flow in the same direction as gravity at a reaction temperature of preferably 400 to 800° C., more preferably 500 to 700° C., still more preferably 600° C. This enables decomposition of the stock oil in a short time so that olefins at a high yield and gasoline can be produced. Such bottom oil of a HS-FCC has a feature of having a higher aromatic index fa than other stock oils.

The aromatic component extracted from fluid catalytic cracking residue oil or from high-severity fluid catalytic cracking residue oil is obtained by selective extraction using dimethylformamide or the like for separation into an aromatic component and a saturated component, thus obtaining the aromatic component.

The saturated component extracted from fluid catalytic cracking residue oil or from high-severity fluid catalytic cracking residue oil is obtained by mixing the fluid catalytic cracking residue oil or the high-severity fluid catalytic cracking residue oil with n-heptane in the same volume as that of the oil, and then selectively extracting with dimethylformamide for separation into an aromatic component and a saturated component, thus obtaining the saturated component.

The hydrodesulfurization oil is obtained by highly hydrodesulfurization of heavy oil. For example, the hydrodesulfurization oil is a heavy oil being obtained by subjecting heavy oil having sulfur content of 1% by weight or more to a hydrodesulfurization treatment at the hydrogen partial pressure of 10 MPa or more, and having sulfur content of 1.0% by weight or less, nitrogen content of 0.5% by weight or less and an aromatic carbon fraction (fa) of 0.1 or more. The hydrodesulfurization oil is preferably the hydrodesulfurization oil obtained by subjecting atmospheric distillation residue oil to hydrodesulfurization in the presence of a catalyst in such a manner for keeping its hydrogenolysis rate 25% or less.

The vacuum residue oil (VR) is bottom oil of the vacuum distillation obtained by subjecting crude oil to atmospheric distillation to obtain gas, light oil and atmospheric residue oil, and subjecting the atmospheric residue oil, for example, to heating in a heating furnace under reduced pressure of 10 to 30 Torr at an outlet temperature ranging from 320 to 360° C.

The desulfurized deasphalted oil is obtained by subjecting oil such as vacuum distillation residue oil to solvent deasphalting using propane, butane, pentane or the mixture thereof as the solvent for removal of the asphaltene component to obtain deasphalted oil (DAO), and desulfurizing the deasphalted oil (DAO) with indirect desulfurization equipment (Isomax) or the like to reduce the sulfur content to preferably 0.05 to 0.40% by weight.

The atmospheric residue oil is the fraction obtained by subjecting crude oil to atmospheric distillation for heating under atmospheric pressure. For example, the atmospheric distillation separates the crude oil into gas.LPG, gasoline fraction, kerosene fraction, light oil fraction and atmospheric residue oil depending on boiling points of the fractions, among which the atmospheric residue oil is the fraction having the highest boiling point. The heating temperature varies depending on the production area of the crude oil, and is not limited especially as long as these fractions can be obtained by fractional distillation. For example, crude oil may be heated to 320° C.

The light straight-run light oil and the heavy straight-run light oil are light or heavy light oils obtained by distillation at atmospheric pressure of crude oil using atmospheric distillation equipment.

The hydrodesulfurization light oil is light oil obtained by desulfurizing light straight-run light oil using hydrodesulfurization equipment.

The fluid catalytic light oil is light oil obtained by a fluid catalytic cracker, and is a fraction having a higher boiling point than the cracked gasoline fraction.

The direct desulfurization light oil is light oil obtained by desulfurizing atmospheric residue oil by direct desulfurization equipment.

The indirect desulfurization light oil is light oil obtained by desulfurizing vacuum light oil by indirect desulfurization equipment.

Particularly preferable examples of the stock oil composition include a stock oil composition satisfying the requirements of (1) having an aromatic carbon fraction (aromatic index) fa of 0.3 to 0.65, and (2) having normal paraffin content of 5 to 20% by weight. More preferably, they include a stock oil composition satisfying the requirements of (1) and (2) and further (3) containing HS-FCC cracked residue in the range of 3 to 20% by weight.

Stock oil subjected to a high-temperature treatment generates thermal decomposition and polymerization and/or condensation reaction, thereby producing raw coke via the step of producing large liquid crystals known as mesophase as an intermediate. At this time, it is preferable to use a stock oil composition containing both of the following components (1): a stock oil component of forming favorable bulk mesophase, and (2): a stock oil component of being able to produce gas having a function to lower the size of anisotropic regions configuring the mesophase during polycondensation of the bulk mesophase for carbonization and solidification. It is more preferable to use a stock oil composition containing the components (1) and (2) and further component (3): a component of bonding anisotropic regions.

(1) The stock oil component of forming favorable bulk mesophase is a component of giving the aromatic index fa of 0.3 to 0.65, (2) the stock oil component of being able to produce gas is a component of corresponding to the normal paraffin content of 5 to 20% by weight, and (3) the component of bonding anisotropic regions is HS-FCC cracked residue contained in the range of 3 to 20% by weight.

Such a stock oil composition is preferably used as a raw material of the raw coke in the present invention because anisotropic regions formed by the stock oil component forming favorable bulk mesophase are limited to a relatively small size, and thus interfaces between the bonding anisotropic regions can be increased during the subsequent heat treatment and the HS-FCC cracked residue can connect the anisotropic regions.

Such a stock oil composition is subjected to coking, and raw coke containing relatively small-sized anisotropic regions can be obtained. The raw coke is then calcined at high temperature, and calcined coke containing relatively small-sized anisotropic regions can be obtained.

This is the first example in the production of raw coke or calcined coke in which HS-FCC cracked residue is added to a stock oil composition as a raw material for the raw coke or the calcined coke. It is surprising that HS-FCC cracked residue contained is effective.

The aromatic carbon fraction or aromatic index (fa) can be calculated by the following Equation 1:

$$fa = 3.65 \times D - 0.00048 H - 2.969 \quad \text{(Equation 1)}$$

wherein $H = 875 \times [\log\{\log(V+0.85)\}]$, D denotes density of stock oil composition (g/cm$^3$), and V denotes viscosity of stock oil composition (mm$^2$/sec.).

The content of normal paraffin in the stock oil composition is the value measured using a capillary column-mounted gas chromatograph. Specifically, after verification of normal paraffin with a reference substance, a non-aromatic component sample separated by the elution chromatography is passed through the capillary column for measurement. The content can be calculated from this measured value based on the total weight of the stock oil composition.

When the aromatic index fa is less than 0.3, the yield of coke from the stock oil composition will be drastically lowered, favorable bulk mesophase cannot be formed, and unfavorably a crystal structure is hardly developed after carbonization. When the aromatic index fa is more than 0.65, lots of mesophases are suddenly generated in the matrix during the course of raw coke production. This will mainly cause sudden coalescence of mesophases instead of single growth of mesophase. Accordingly, since the coalescence rate of mesophases is faster than the generation rate of gas from the normal paraffin-containing component, it becomes impossible to lower the size of anisotropic regions of bulk mesophase. Thus, it is unpreferable.

Accordingly, the aromatic index fa of the stock oil composition is limited to 0.3 to 0.6. The value of fa can be calculated from density D and viscosity V of the stock oil composition. It is particularly preferable that the stock oil composition has the density D of 0.91 to 1.02 g/cm$^3$, the viscosity of 10 to 220 mm$^2$/sec, and fa of 0.3 to 0.65.

The normal paraffin component appropriately contained in the stock oil composition plays an important role of generating gas during a coking treatment so as to limit the size of bulk mesophase to a small size as stated above.

When the content of the normal paraffin is less than 5% by weight, mesophases unnecessarily grow so that huge anisotropic regions are formed unfavorably. When the content s more than 20% by weight, gas is excessively generated from the normal paraffin and tends to act in the direction of disturbing the orientation of the bulk mesophase. Consequently, it is difficult to develop a crystal structure even with carbonization. Thus, it is not preferable. As stated above, the content of the normal paraffin is limited to 5 to 20% by weight.

The HS-FCC cracked residue plays a role of bonding neighboring anisotropic regions appropriately as stated above, and the content of the HS-FCC cracked residue is particularly preferably in the range of 3 to 20% by weight as the content in the stock oil composition. When the content is less than 3% by weight, firm carbon-carbon bonding is not formed between adjacent anisotropic regions during the step of heating, and it is difficult to develop a crystal structure. Thus, it is not preferable. When the content is more than 20% by weight, huge anisotropic regions will be formed in raw coke or calcined coke obtained after heat treatment. When the raw coke or calcined coke is subjected to pulverizing or classifying, gap regions between anisotropic regions become extremely small, so that cracks are apt to be introduced in the planar hexagonal networks in the anisotropic regions, and edge faces in an aligned state are apt to be exposed on the particle surfaces. In a lithium ion secondary battery comprising such an amorphous carbon material, thick coating film is formed at edge faces of the negative electrode, and a resistive component for reversible intercalation of Li ions increases, thereby increasing internal resistance of the battery, and unfavorably degrading life characteristics of the battery.

The stock oil composition having such features is subjected to coking to form the raw coke according to the present invention. As a method for coking of a stock oil composition satisfying predetermined requirements, a delayed coking method is preferable. More specifically, the preferable method comprises a step of heating a stock oil composition by a delayed coker under a controlled coking pressure to obtain raw coke. Preferable operational conditions of the delayed coker are the pressure of 0.1 to 0.8 MPa and the temperature of 400 to 600° C.

Such a preferable range is set for the operational pressure of the coker because the rate of releasing gas generated from normal paraffin-containing component to the outside of the system can be controlled by pressure. As stated above, since the size of anisotropic regions configuring mesophase is controlled by the gas generated, the residence time of the generated gas in the system is an important control parameter of determining the size of the anisotropic regions. Such a preferable range is set for the operational temperature of the coker because such temperatures are required for the growth of mesophase from the stock oil prepared for obtaining the advantageous effects of the present invention.

The thus obtained raw coke is pulverized and classified to have a predetermined particle size. A preferable average particle size is 30 µm or less. The average particle size is based on the measurement by a laser diffraction particle size analyzer. The average particle size of 30 µm or less is employed because this size is typically and suitably used as a negative electrode carbon material of a lithium ion secondary battery. The average particle size is more preferably 5 to 30 µm. An amorphous carbon material obtained by carbonizing raw coke having the average particle size of less than 5 µm has an extremely large specific surface area, so that a lithium ion secondary battery comprising such an amorphous carbon material as the negative electrode has a large contact area of the surface of the amorphous carbon material with electrolyte solution at the negative electrode. Consequently, a decomposition reaction of the electrolyte solution with localized electrons at the negative electrode acting as a catalyst is apt to occur. Thus, it is not preferable.

A method for a carbonization treatment is not particularly limited, and typically comprises a step of heat treatment under an inert gas atmosphere such as nitrogen, argon or helium at the maximum achieving temperature of 900 to 1,500° C., the maximum achieving temperature being held for 0 to 10 hours.

There is no conventional example of using, as a negative electrode material of a lithium ion battery, an amorphous carbon material produced by using HS-FCC cracked residue as a raw material. According to the present invention, HS-FCC cracked residue is mixed in a preferable embodiment of the stock oil composition, so that raw coke or calcined coke containing relatively small-sized anisotropic regions, which can bond appropriately, can be obtained. The obtained raw coke is subjected to pulverizing and classifying, followed by carbonization, or the obtained calcined coke is subjected to pulverizing and classifying, to provide the amorphous carbon material in the first aspect of the present invention.

A method for producing a negative electrode of a lithium secondary battery includes, but not particularly limited to, pressure molding of a mixture (negative electrode mixture) into a predetermined size, the mixture comprising the amorphous carbon material according to the present invention, a binder (binding agent), an optional conductive aid and organic solvent. Another method for producing a negative electrode may include kneading of the amorphous carbon material according to the present invention, a binder (binding agent), a conductive aid and the like in an organic solvent to obtain a slurry, applying the slurry to a collector such as copper foil for drying to form a negative electrode mixture, rolling the negative electrode mixture, and then cutting into a predetermined size.

Examples of the binder (binding agent) can include polyvinylidene fluoride, polytetrafluoroethylene, polyacrylonitrile, polyethylene terephthalate and SBR (styrene-butadiene rubber). The content of the binder in the negative electrode mixture is typically about 1 to 30 parts by weight based on 100 parts by weight of the amorphous carbon material, which may be appropriately selected as needed suitably for design of the battery.

Examples of the conducting aid can include carbon black, graphite, acetylene black, a conductive indium-tin oxide, or a conductive polymer such as polyaniline, polythiophene or polyphenylenevinylene. The amount of conducting aid is preferably 1 to 15 parts by weight based on 100 parts by weight of the amorphous carbon material.

Examples of the organic solvent can include dimethylformamide, N-methylpyrrolidone, pyrrolidone, N-methyl thiopyrrolidone, hexamethylphosphoramide, dimethylacetamide, isopropanol and toluene.

The amorphous carbon material, the binder, the optional conductive aid and the organic solvent may be mixed by a well-known device such as a screw-type kneader, a ribbon mixer, a multi-purpose mixer or a planetary mixer. The mixture is then made into a particular shape by roll pressurization or press pressurization, and the pressure applied at this time is preferably about 100 to 300 MPa.

The collector may be made of any material without particular limit as long as it does not form alloy with lithium. Examples of the material can include copper, nickel, titanium and stainless steel. The collector may have any shape without particular limit. Examples of the shape can include a strip of foil, a strip of perforated foil and a meshy strip. Alternatively, for example, a porous material such as porous metal (sponge metal) or carbon paper may be used.

The slurry may be applied to the collector by the well-known method including, but not limited to, metal mask printing, electrostatic coating, dip coating, spray coating, roll coating, doctor blade coating, gravure coating, screen printing and die coating. The application may be typically followed by rolling with a flat press, a calendar roll or the like, if necessary.

The negative electrode material slurry shaped in a sheet form, a pellet form or the like, and the collector may be integrated by a well-known method such as roll, press or the combination of them.

A lithium-ion secondary battery comprising the amorphous carbon material for a negative electrode of a lithium ion secondary battery according to the present embodiment may be produced by a method comprising the steps of placing the prepared negative electrode and a positive electrode so as to be opposed to each other via a separator, and adding an electrolyte solution thereto.

Examples of the active material used for the positive electrode may include, but not particularly limited to, a metal compound, a metal oxide, a metal sulfide or a conductive polymer material, each capable of doping or reversible intercalation with lithium ions. Specific examples thereof can include lithium cobaltate ($LiCoO_2$), lithium nickelate ($LiNiO_2$), lithium manganate ($LiMn_2O_4$), lithium composite oxide ($LiCo_XNi_YM_ZO_2$, X+Y+Z=1, M denotes Mn, Al or the like), a material having a part of the foregoing transition metal replaced by the other element, lithium vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine-type $LiMPO_4$ wherein M is selected from group consisting of Co, Ni, Mn and Fe, conductive polymers such as polyacetylene, polyaniline, polypyrrole, polythiophene and polyacene, porous carbon, and mixtures of the foregoing.

In the present invention, a preferable active material of a positive electrode includes iron-based or manganese-based materials and a more preferable active material of a positive electrode includes $LiMn_2O_4$ and $LiFePO_4$. A particularly preferable active material of a positive electrode includes a material having about 0.01 to 0.1 atom of Al per atom of Mn mixed into said active material of a positive electrode.

Such a positive electrode enables stable usage of lithium ion battery at the late-stage of the life.

Examples of the separator to be used can include non-woven fabric, cloth and microporous film mainly containing polyolefin such as polyethylene and polypropylene, as well as combinations thereof. It is not necessary to use the separator if the positive electrode and the negative electrode of the lithium ion secondary battery to be produced are not in direct contact.

The electrolyte solution or the electrolyte to be used in the lithium ion secondary battery may include a well-known organic electrolyte solution, inorganic solid electrolyte and polymer solid electrolyte. An organic electrolyte solution is preferable from the viewpoint of electrical conductivity.

Examples of the organic electrolyte solution can include organic solvents including ethers such as dibutyl ether, ethyleneglycol monomethyl ether, ethyleneglycol monoethyl ether, ethyleneglycol monobutyl ether, diethyleneglycol monomethyl ether and ethyleneglycol phenyl ether; amides such as N-methylformamide, N,N-dimethylformamide, N-ethylformamide, N,N-diethylformamide, N-methylacetamide, N,N-dimethylacetamide, N-ethylacetamide and N,N-diethylacetamide; sulfur-containing compounds such as dimethyl sulfoxide and sulfolane; dialkylketones such as methyl ethyl ketone and methyl isobutyl ketone; cyclic ethers such as tetrahydrofuran and 2-methoxytetrahydrofuran; cyclic carbonates such as ethylene carbonate, butylene carbonate, propylene carbonate and vinylene carbonate; chain carbonates such as diethyl carbonate, dimethyl carbonate, methylethyl carbonate and methylpropyl carbonate; cyclic carbonate esters such as γ-butyrolactone and γ-valerolactone; chain carbonate esters such as methyl acetate, ethyl acetate, methyl propionate and ethyl propionate; N-methyl-2-pyrrolidinone; acetonitrile, and nitromethane. Any of these solvents may be used singly, or two or more thereof may be used in admixture.

Various lithium salts may be used as solutes in these solvents. Examples of typically known lithium salts include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LiN(CF_3SO_2)_2$ and $LiN(C_2F_5SO_2)_2$.

Examples of the polymer solid electrolyte include a polyethylene oxide derivative and a polymer containing the derivative, a polypropylene oxide derivative and a polymer containing the derivative, a phosphoric acid ester polymer, and a polycarbonate derivative and a polymer containing the derivative.

The members other than the aforementioned members, which are required for configuring a battery, may be selected without particular limit.

The lithium ion secondary battery may typically include, but not particularly limited to, a battery having a rolled electrode group inserted into a battery case and sealed, wherein the rolled electrode group has been formed by winding in a spiral fashion a strip of positive electrode, a strip of negative electrode and a separator intervening therebetween; and a battery having a layered electrode plate group inserted into an outer casing and sealed, wherein the layered electrode plate group has been formed by stacking a flat positive electrode, a flat negative electrode and a separator intervening therebetween. The Lithium ion secondary battery may be used as, for example, a paper battery, a button battery, a coin battery, a stacked battery, a cylindrical battery or a square battery.

The present lithium ion secondary battery comprising the amorphous carbon material of the present invention as a negative electrode material can secure high-degree of reliability compared with a conventional lithium secondary battery comprising a conventional carbon material. Accordingly, the present lithium ion secondary battery is applicable to vehicles, specifically to hybrid vehicles, plug-in hybrid vehicles and electric vehicles as well as to industry such as electricity storage for electric system infrastructure.

EXAMPLES

The present invention will now be described in detail based on Examples and Comparative Examples. It should not be construed that the present invention is limited to Examples.

1. Raw Cokes and Production Method Thereof (1) Raw Coke A

Hydrodesulfurization light oil (sulfur content of 500 weight-ppm and density at 15° C. of 0.88 g/cm³, which are the same in Examples below) was subjected to fluid-catalytic cracking to obtain fluid catalytic cracked residue. Atmospheric distillation residue oil having sulfur content of 3.1% by weight was hydrodesulfurized in the presence of a catalyst in such a manner that the hydrocracking rate became 25% or lower, thereby obtaining hydrodesulfurized oil. The hydrodesulfurization conditions included the total pressure of 180 MPa, the partial pressure of hydrogen of 160 MPa and the temperature of 380° C. Further, hydrodesulfurization light oil (sulfur content of 500 weight-ppm and the density of 0.88 g/cm³ at 15° C.) was subjected to fluid catalytic cracking using a high severity fluid catalytic cracker (HS-FCC) to obtain HS-FCC cracked residue.

Next, to a mixture of the fluid catalytic cracked residue and the hydrodesulfurized oil at the ratio of 1:1, the HS-FCC cracked residue was added so as to be 1% by weight, thereby obtaining a stock oil composition as a raw material of coke. Normal paraffin content and aromatic index fa of this stock oil composition are shown in Table 1. This stock oil composition was introduced to a delayed coker for coking under an inert gas atmosphere at 550° C. to obtain Raw Coke A.

(2) Raw Coke B

To a mixture of the fluid catalytic cracked residue and the hydrodesulfurized oil at the weight ratio of 3:5, the HS-FCC cracked residue was added so as to be 1% by weight, thereby obtaining a stock oil composition. All of the stock oils were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke B.

(3) Raw Coke C

The fluid catalytic cracked residue was subjected to an addition of n-heptane of the same volume and mixed. The mixture was subjected to selective extraction with dimethylformamide and separated into an aromatic component and a saturated component, among which the saturated component was selectively extracted. Thus, the saturated component extracted from the fluid catalytic cracked residue was obtained. To a mixture of the fluid catalytic cracked residue and this saturated component extracted from the fluid catalytic cracked residue at the weight ratio of 1:2, the HS-FCC cracked residue was added so as to be 2% by weight, thereby obtaining a stock oil composition. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke C.

(4) Raw Coke D

To a mixture of the fluid catalytic cracked residue and the saturated component extracted from the fluid catalytic cracked residue at the weight ratio of 4:3, the HS-FCC cracked residue was added so as to be 2% by weight, thereby obtaining a stock oil composition. The saturated component extracted from the fluid catalytic cracked residue was obtained in the same manner as in the production method of Raw Coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke D.

(5) Raw Coke E

To a mixture of the fluid catalytic cracked residue and the saturated component extracted from the fluid catalytic cracked residue at the weight ratio of 4:1, the HS-FCC cracked residue was added so as to be 3% by weight, thereby obtaining a stock oil composition. The saturated component extracted from the fluid catalytic cracked residue was obtained in the same manner as in the production method of Raw Coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C., thereby obtaining Raw Coke E.

(6) Raw Coke F

To a mixture of the fluid catalytic cracked residue and the saturated component extracted from the fluid catalytic cracked residue at the weight ratio of 2:1, the HS-FCC cracked residue was added so as to be 3% by weight, thereby obtaining a stock oil composition. The saturated component extracted from the fluid catalytic cracked residue was obtained in the same manner as in the production method of Raw Coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C., thereby obtaining Raw Coke F.

(7) Raw Coke G

To a mixture of the fluid catalytic cracked residue and the saturated component extracted from the fluid catalytic cracked residue at the weight ratio of 1:1, the HS-FCC cracked residue was added so as to be 3% by weight, thereby obtaining a stock oil composition. The saturated component extracted from the fluid catalytic cracked residue was obtained in the same manner as in the production method of Raw Coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C., thereby obtaining Raw Coke G.

(8) Raw Coke H

To a mixture of the fluid catalytic cracked residue and the hydrodesulfurized oil at the weight ratio of 6:1, the HS-FCC cracked residue was added so as to be 5% by weight, thereby obtaining a stock oil composition. All of the stock oils were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke H.

(9) Raw Coke I

To a mixture of the fluid catalytic cracked residue and the hydrodesulfurized light oil at the weight ratio of 6:1, the HS-FCC cracked residue was added so as to be 6% by weight, thereby obtaining a stock oil composition. All of the stock oils were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke I.

(10) Raw Coke J

To a mixture of the fluid catalytic cracked residue and the saturated component extracted from the fluid catalytic cracked residue at the weight ratio of 6:1, the HS-FCC cracked residue was added so as to be 7% by weight, thereby obtaining a stock oil composition. The saturated component extracted from the fluid catalytic cracked residue was obtained in the same manner as in the production method of Raw Coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke J.

(11) Raw Coke K

To a mixture of the fluid catalytic cracked residue and the saturated component extracted from the fluid catalytic cracked residue at the weight ratio of 2:1, the HS-FCC cracked residue was added so as to be 7% by weight, thereby obtaining a stock oil composition. The saturated component extracted from the fluid catalytic cracked residue was obtained in the same manner as in the production method of Raw Coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke K.

(12) Raw Coke L

To a mixture of the fluid catalytic cracked residue and the saturated component extracted from the fluid catalytic cracked residue at the weight ratio of 6:5, the HS-FCC cracked residue was added so as to be 10% by weight, thereby obtaining a stock oil composition. The saturated component extracted from the fluid catalytic cracked residue was obtained in the same manner as in the production method of Raw Coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke L.

(13) Raw Coke M

To a mixture of the fluid catalytic cracked residue and the saturated component extracted from the fluid catalytic cracked residue at the weight ratio of 6:7, the HS-FCC cracked residue was added so as to be 12% by weight, thereby obtaining a stock oil composition. The saturated component extracted from the fluid catalytic cracked residue was obtained in the same manner as in the production method of the raw coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke M.

(14) Raw coke N

To a mixture of the fluid catalytic cracked residue and the saturated component extracted from the fluid catalytic cracked residue at the weight ratio of 2:3, the HS-FCC cracked residue was added so as to be 10% by weight, thereby obtaining a stock oil composition. The saturated component extracted from the fluid catalytic cracked residue was obtained in the same manner as in the production method of Raw Coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke N.

(15) Raw Coke O

To a mixture of the fluid catalytic cracked residue and hydrodesulfurized light oil at the weight ratio of 8:1, the HS-FCC cracked residue was added so as to be 16% by weight, thereby obtaining a stock oil composition. All of the stock oils were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke O.

(16) Raw Coke P

To a mixture of the fluid catalytic cracked residue and hydrodesulfurized light oil at the weight ratio of 4:1, the HS-FCC cracked residue was added so as to be 20% by weight, thereby obtaining a stock oil composition. All of the stock oil was obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke P.

(17) Raw Coke Q

To a mixture of the fluid catalytic cracked residue and hydrodesulfurized light oil at the weight ratio of 2:1, the HS-FCC cracked residue was added so as to be 18% by weight, thereby obtaining a stock oil composition. All of the stock oils were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke Q.

(18) Raw Coke R

To a mixture of the fluid catalytic cracked residue and the hydrodesulfurized oil at the weight ratio of 8:1, the HS-FCC cracked residue was added so as to be 21% by weight, thereby obtaining a stock oil composition. All of the stock oils were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke R.

(19) Raw Coke S

To a mixture of the fluid catalytic cracked residue and an aromatic component extracted from the fluid catalytic cracked residue at the weight ratio of 5:1, the HS-FCC cracked residue was added so as to be 22% by weight, thereby obtaining a stock oil composition. Herein, the fluid catalytic cracked residue was subjected to selective extraction with dimethylformamide and separated into the aromatic component and a saturated component, among which the aromatic component was selectively extracted, thereby obtaining the aromatic component extracted from the fluid catalytic cracked residue. All of the stock oils other than the aromatic component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke S.

(20) Raw Coke T

To a mixture of the fluid catalytic cracked residue and the saturated component extracted from the fluid catalytic cracked residue at the weight ratio of 5:1, the HS-FCC cracked residue was added so as to be 22% by weight, thereby obtaining a stock oil composition. The saturated component extracted from the fluid catalytic cracked residue was obtained in the same manner as in the production method of Raw Coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke T.

(21) Raw Coke U

To a mixture of the fluid catalytic cracked residue and the saturated component extracted from the fluid catalytic cracked residue at the weight ratio of 5:2, the HS-FCC cracked residue was added so as to be 21% by weight, thereby obtaining a stock oil composition. The saturated component extracted from the fluid catalytic cracked residue was obtained in the same manner as in the production method of Raw Coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke U.

(22) Raw Coke V

To a mixture of the fluid catalytic cracked residue and the saturated component extracted from the fluid catalytic cracked residue at the weight ratio of 5:3, the HS-FCC cracked residue was added so as to be 24% by weight, thereby obtaining a stock oil composition. The saturated component extracted from the fluid catalytic cracked residue was obtained in the same manner as in the production method of Raw Coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke V.

(23) Raw Coke W

To a mixture of the fluid catalytic cracked residue and the aromatic component extracted from the fluid catalytic cracked residue at the weight ratio of 6:1, the HS-FCC cracked residue was added so as to be 4% by weight, thereby obtaining a stock oil composition. The aromatic component extracted from the fluid catalytic cracked residue was obtained in the same manner as in the production method of Raw Coke S. All of the stock oils other than the aromatic component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke W.

(24) Raw Coke X

To a mixture of the fluid catalytic cracked residue and the aromatic component extracted from the fluid catalytic cracked residue at the weight ratio of 2:1, the HS-FCC cracked residue was added so as to be 20% by weight, thereby obtaining a stock oil composition. The aromatic component extracted from the fluid catalytic cracked residue was obtained in the same manner as in the production method of Raw Coke S. All of the stock oils other than the aromatic component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke X.

(25) Raw Coke Y

To a mixture of the fluid catalytic cracked residue and the saturated component extracted from the fluid catalytic cracked residue at the weight ratio of 3:1, the HS-FCC cracked residue was added so as to be 1% by weight, thereby obtaining a stock oil composition. The saturated component extracted from the fluid catalytic cracked residue was obtained in the same manner as in the production method of Raw Coke C. All of the stock oils other than the saturated component extracted from the fluid catalytic cracked residue were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke Y.

(26) Raw Coke Z

To a mixture of the fluid catalytic cracked residue and hydrodesulfurized light oil at the weight ratio of 3:2, the HS-FCC cracked residue was added so as to be 3% by weight, thereby obtaining a stock oil composition. All of the stock oils were obtained in the same manner as in the production method of Raw Coke A. Normal paraffin content and aromatic index fa of this stock oil composition are shown in Table 1. This stock oil composition was introduced to a delayed coker for coking under an inert gas atmosphere at 550° C. to obtain Raw Coke Z.

Examples 1 to 8

Each of Raw Cokes described in Table 1 was pulverized using a mechanical pulverizer ("Super Rotor Mill", product of Nisshin Engineering), and classified using a precision air classifier ("Turbo Classifier", product of Nisshin Engineering), thereby obtaining raw coke powder having an average particle size of 12 μm. This powder was then carbonized using a roller hearth kiln (product of Takasago Industry Co., Ltd.) under a nitrogen gas stream at the maximum achieving temperature of 1,200° C. which was held for 5 hours.

Examples 9 to 11

Raw Cokes Q and K were introduced to a rotary kiln for carbonizing at 1,400° C. to obtain calcined cokes. The obtained calcined cokes were pulverized using a mechanical pulverizer ("Super Rotor Mill", product of Nisshin Engineering) and classified using a precision air classifier ("Turbo Classifier", product of Nisshin Engineering), thereby obtaining amorphous carbon materials raw cokes, having an average particle size of 12 μm (in Example 10) and 6.0 μm (in Example 11). The obtained amorphous carbon materials had the size Lc(002) of a crystallite of a (002) diffraction line, which was measured by powder X-ray diffractometry, of 4.9 nm (in Example 10) and 4.8 nm (in Example 11).

Comparative Examples 1 to 17

Each of Raw Cokes described in Table 1 was pulverized using a mechanical pulverizer ("Super Rotor Mill", product of Nisshin Engineering) and classified using a precision air classifier ("Turbo Classifier", product of Nisshin Engineering), thereby obtaining raw coke powder having an average particle size of 12 μm. This powder was then carbonized using a roller hearth kiln (product of Takasago Industry Co., Ltd.) under a nitrogen gas stream at the maximum achieving temperature of 1,200° C. which was held for 5 hours.

Comparative Examples 18 to 20

Raw Coke R was introduced to a rotary kiln for carbonizing at 1,400° C. (in Comparative Example 18), at 1,600° C. (in Comparative Example 19) and at 1,800° C. (in Comparative Example 20), thereby obtaining calcined cokes. Each of the obtained calcined cokes was pulverized using a mechanical pulverizer ("Super Rotor Mill", product of Nisshin Engineering) and classified using a precision air classifier ("Turbo Classifier", product of Nisshin Engineering), thereby obtaining amorphous carbon materials, each having an average particle size of 12 μm.

Comparative Examples 21 and 22

Raw Coke described in Table 1 was pulverized using a mechanical pulverizer ("Super Rotor Mill", product of Nisshin Engineering) and classified using a precision air classifier ("Turbo Classifier", product of Nisshin Engineering), thereby obtaining raw coke powder having an average particle size of 12 μm. This powder was then carbonized using a roller hearth kiln (product of Takasago Industry Co., Ltd.) under a nitrogen gas stream at the maximum achieving temperature of 850° C. (in Comparative Example 21) which was held for 5 hours and at the maximum achieving temperature of 1,600° C. (in Comparative Example 22) which was held for 5 hours.

(1) Physical Properties of Stock Oil Compositions

The content of normal paraffin of each of the stock oil compositions was measured by a capillary column-mounted gas chromatograph. Specifically, after verification of normal paraffin with a reference substance, a non-aromatic component sample separated by the elution chromatography was passed through the capillary column for measurement. The content was calculated from this measured value based on the total weight of the stock oil composition.

The aromatic index fa was calculated by the following Equation 1:

$$fa = 3.65 \times D - 0.00048H - 2.969 \quad \text{(Equation 1)}$$

wherein $H = 875 \times [\log \{\log(V+0.85)\}]$, D denotes density of stock oil (g/cm$^3$), and V denotes viscosity of stock oil (mm$^2$/sec).

The density of stock oil was measured and calculated at 15° C. by a method specified by JIS-K2249. The viscosity of stock oil was measured and calculated at 50° C. using a JIS-compliant viscometer by a method specified by MS-K2283, which were then substituted into Equation 1, thus calculating the aromatic index fa.

The normal paraffin content and the aromatic index fa in each of the stock oil compositions are as shown in Table 1.

(2) Calculation of Crystallite Size Lc(002) of Amorphous Carbon Material

The obtained amorphous carbon materials were mixed with 5% by weight of a Si reference sample as an internal reference, and placed in a glass sample holder (25 mmφ×0.2 mm t). Then measurement by X-ray wide-angle diffractometry was performed based on the method (Tanso 2006, No. 221, pp. 52 to 60) specified by Japan Society for the Promotion of Science, Committee No. 117, and thereby the size of the graphite powder Lc(002) was calculated. The powder X-ray diffractometer used was ULTIMA IV (product of Rigaku Corporation), where CuKα radiation (with Kβ filter Ni) was used as an X-ray source, and applied voltage and current to an X-ray vacuum tube were set at 40 kV and 40 mA, respectively.

The diffraction pattern thus obtained was analyzed also based on the method (Tanso 2006, No. 221, pp. 52 to 60) specified by Japan Society for the Promotion of Science, Committee No. 117. More specifically, the measurement data thus obtained was processed by smoothing and background removal, followed by absorption correction, polarization correction and Lorentz correction. Then, using the peak position and value width of the (111) diffraction line of the Si reference sample for correction against the diffraction line (002) of the amorphous carbon material, the crystallite size was calculated. The crystallite size was calculated from the full width at half maximum (FWHM) of corrected peak using the following Scherrer equation. The measurement and analysis were each conducted three times and the average value was used as Lc(002):

$$L = K \times \lambda (\beta 0 \times \cos \theta_B) \quad \text{Scherrer equation}$$

wherein L represents a crystallite size (nm); K represents a shape factor constant (=1.0); λ represents a X-ray wavelength (=0.15406 nm); $\theta_B$ represents a Bragg angle; and β0 represents the full width at half maximum (FWHM) (corrected value).

Measurement results of Lc(002) of the amorphous carbon materials are as shown in Table 1.

(3) ESR Measurement of Amorphous Carbon Material

The 2.5 mg of an amorphous carbon material was placed in a test tube, subjected to evacuation by a rotary pump, and filled with He gas for ESR measurement. The ESR equipment (ESP 350E, product of Bruker Corp.), the microwave frequency counter (HP5351P, product of Hewlett Packard Corp.), the gauss meter (ERO35M, product of Bruker Corp), and the cryostat were (ESR910, product of Oxford Corp.) were used. The microwave of X band (9.47 GHz) was used and measured at the intensity of 1 mW, the center magnetic field of 3,360G and the magnetic field modulation of 100 kHz. The ESR measurements were carried out at two measurement temperatures, 4.8 K and 40 K.

The results of the signal intensity and the line width ΔHpp of the ESR spectra of the amorphous carbon materials obtained as Examples and Comparative Examples are shown in Table 1. The signal intensity was obtained by twice integration of the obtained ESR spectrum, and the line width ΔHpp used was a value of a difference between two peaks (maximum and minimum) in the ESR spectrum (differential curve).

Fabrication of Batteries and Evaluation Method of their Characteristics (1) Method for Fabricating Batteries A sectional-view of a fabricated battery 10 is shown in FIG. 1. FIG. 1 contains a negative electrode 11, a negative electrode collector 12, a positive electrode 13, a positive electrode collector 14, a separator 15 and an aluminum laminate outer casing 16.

The positive electrode was a sheet electrode formed as follows. Lithium manganate $Li(Li_{0.1}Al_{0.1}Mn_{1.8})O_4$ having an average particle size of 10 μm as a positive electrode material, a binder of polyvinylidene fluoride (produced by Kureha Corporation, KF#1320) and acetylene black (Denka black produced by Denki Kagaku Kogyo K.K.) at the weight ratio of 89:6:5 were mixed, subjected to an addition of N-methyl-2-pyrrolidinone, kneaded, and made into paste. The paste was applied to one surface of aluminum foil having a thickness of 30 μm, dried, subjected to rolling, and cut in such a manner that the size of the coated part was 30 mm in width and 50 mm in length. The amount applied per unit area was selected to be 10 mg/cm² as the weight of lithium manganate.

A part of this sheet electrode having the positive electrode mixture scraped off orthogonally to the longitudinal direction of the sheet to expose the aluminum foil, plays a role of a positive electrode lead plate because the exposed aluminum foil was connected with a collector (aluminum foil) of the coated part in an integral manner.

A negative electrode was a sheet electrode formed as follows. The amorphous carbon materials obtained in the above Examples and Comparative Examples as negative electrode materials, a binder of polyvinylidene fluoride (produced by Kureha Corporation, KF#9310) and acetylene black (Denka black produced by Denki Kagaku Kogyo K.K.) at the weight ratio of 91:2:8 were mixed, subjected to an addition of N-methyl-2-pyrrolidinone, kneaded, and made into paste. The paste was applied to one surface of copper foil having a thickness of 18 μm, dried, subjected to rolling, and cut in such a manner that the size of the coated part was 32 mm in width and 52 mm in length. The amount applied per unit area was selected to be 6 mg/cm² as the weight of the amorphous carbon materials.

A part of this sheet electrode having the negative electrode mixture scraped off orthogonally to the longitudinal direction of the sheet to expose the copper foil, plays a role of a negative electrode lead plate because the exposed copper foil was connected with a collector (copper foil) of the coated part in an integral manner.

The battery was fabricated by sufficiently drying the positive electrode, the negative electrode, the separator and the other components, and introducing them into a glove box filled with argon gas having the dew point of −100° C. for assembly. As the drying conditions, the positive electrode and the negative electrode were dried at 150° C. under a vacuum for 12 hours or longer, and the separator and the other components were dried at 70° C. under a vacuum for 12 hours or longer.

The dried positive electrode and negative electrode were laminated so that the coated part of the positive electrode and the coated part of the negative electrode were opposed via micro-porous film (product of Celgard Corp. #2400) made of polypropylene, and fixed with a polyimide tape. Herein, the positive electrode and the negative electrode were laminated in such a manner that the perimeter of the coated part of the positive electrode which was projected onto the coated part of the negative electrode was surrounded by the inside of the perimeter of the coated part of the negative electrode. The obtained single-layer electrode body was surrounded by an aluminum lamination film, and an electrolyte solution was poured therein. The laminate film was heat-sealed while letting the aforementioned positive and negative electrode lead plates stick out, thereby fabricating a sealed single-layer laminate battery. The electrolyte solution used was obtained by dissolving lithium hexafluorophosphate ($LiPF_6$) in the mixture of ethylene carbonate and ethylmethyl carbonate at the volume ratio of 3:7, so as to become a lithium hexafluorophosphate concentration of 1 mol/L.

(2) Method for Evaluating Batteries

The obtained batteries were placed in a constant temperature room at 25° C., and the following charge and discharge experiments were conducted. Firstly, charge was conducted at a constant current of 1.5 mA until the battery voltage reached 4.2 V. After 10 minute pause, discharge was conducted at a constant current of the same current (1.5 mA) until the battery voltage reached 3.0 V. Such a charge/discharge cycle was repeated 10 times. Since these charge/discharge cycles were to check abnormality of the batteries, the number of these cycles was not added to the number of cycles for the charge/discharge experiments. It was found that all of the batteries fabricated in the present embodiment were free from abnormality.

Next, constant current/constant voltage charge was performed at the charge current of 15 mA, the charge voltage of 4.2 V and the charge time of 3 hours. After 1 minute pause, discharge was conducted at a constant current of the same current (15 mA) until the battery voltage reached 3.0 V. The discharge capacity obtained at this time was regarded as the discharge capacity at the first cycle. Such a charge/discharge cycle under the same conditions was repeated 2,000 times, and the ratio (%) of the discharge capacity at the 2,000th cycle to the discharge capacity at the first cycle was calculated. The discharge capacity at the first cycle, the discharge capacity at the 2,000th cycle, and the capacity maintenance ratio after 2,000 cycles (the ratio (%) of the discharge capacity at the 2,000th cycle to the discharge capacity at the first cycle) are shown in Table 1.

Discussion on Experimental Results

Physical properties of the amorphous carbon materials in Examples and Comparative Examples and characteristics of lithium ion secondary batteries comprising the amorphous carbon materials are shown in Table 1.

TABLE 1

Physical Property of Amorphous Carbon Material

| | Physical Property of Stock Oil Composition | | | Carbonization Temperature (°C.) | ESR Spectrum | | | Battery Characteristics | | |
|---|---|---|---|---|---|---|---|---|---|---|
| | fa (—) | Normal Paraffin Content (% by weight) | Raw Cokes | | Signal Intensity Ratio (—) | Line Width ΔHpp (G) | XRD Lc (002) (nm) | Discharge Capacity at 1st Cycle (mAh) | Discharge Capacity at 2000th Cycle (mAh) | Capacity Maintenance Ratio after 2000 Cycles (%) |
| Example 1 | 0.30 | 5.0 | E | 1200 | 3.5 | 70 | 3.3 | 15.7 | 14.0 | 89.2 |
| Example 2 | 0.30 | 12 | F | 1200 | 3.5 | 123 | 3.1 | 15.4 | 14.0 | 90.4 |
| Example 3 | 0.30 | 20 | G | 1200 | 3.5 | 180 | 2.6 | 15.2 | 13.6 | 89.2 |
| Example 4 | 0.43 | 5.0 | J | 1200 | 3.3 | 70 | 4.7 | 16.2 | 14.8 | 91.3 |
| Example 5 | 0.45 | 12 | K | 1200 | 2.9 | 119 | 4.5 | 16.1 | 14.7 | 91.7 |
| Example 6 | 0.46 | 20 | L | 1200 | 3.1 | 180 | 4.2 | 16.0 | 14.5 | 90.9 |
| Example 7 | 0.65 | 5.1 | O | 1200 | 2.4 | 70 | 6.4 | 17.0 | 15.2 | 89.2 |
| Example 8 | 0.65 | 12 | P | 1200 | 2.4 | 120 | 6.2 | 16.9 | 15.1 | 89.6 |
| Example 9 | 0.65 | 20 | Q | 1400 | 2.4 | 180 | 5.8 | 16.7 | 14.9 | 89.0 |
| Example 10 | 0.45 | 12 | K | 1400 | 3.1 | 102 | 4.9 | 16.2 | 14.7 | 91.0 |
| Example 11 | 0.45 | 12 | K | 1400 | 3.3 | 95 | 4.8 | 16.1 | 14.4 | 89.6 |
| Comp. Ex. 1 | 0.12 | 2.1 | A | 1200 | 4.0 | 36 | 2.4 | 15.0 | 10.7 | 71.2 |
| Comp. Ex. 2 | 0.13 | 12 | B | 1200 | 4.2 | 119 | 2.3 | 15.0 | 10.8 | 72.1 |
| Comp. Ex. 3 | 0.12 | 23 | C | 1200 | 4.0 | 218 | 2.0 | 14.8 | 10.4 | 70.3 |
| Comp. Ex. 4 | 0.29 | 12 | D | 1200 | 3.6 | 122 | 2.9 | 15.2 | 11.2 | 73.8 |
| Comp. Ex. 5 | 0.44 | 2.3 | H | 1200 | 3.2 | 37 | 5.1 | 16.4 | 11.6 | 70.7 |
| Comp. Ex. 6 | 0.45 | 4.1 | I | 1200 | 3.1 | 69 | 4.9 | 16.3 | 12.2 | 75.1 |
| Comp. Ex. 7 | 0.43 | 21 | M | 1200 | 3.3 | 181 | 3.9 | 15.6 | 11.7 | 74.9 |
| Comp. Ex. 8 | 0.45 | 23 | N | 1200 | 3.1 | 188 | 3.7 | 15.7 | 11.6 | 74.1 |
| Comp. Ex. 9 | 0.67 | 12 | R | 1200 | 2.3 | 112 | 6.5 | 17.1 | 12.8 | 75.3 |
| Comp. Ex. 10 | 0.82 | 2.1 | S | 1200 | 1.7 | 29 | 8.0 | 17.6 | 12.2 | 69.3 |
| Comp. Ex. 11 | 0.79 | 12 | T | 1200 | 1.7 | 137 | 7.2 | 17.4 | 12.2 | 69.9 |
| Comp. Ex. 12 | 0.81 | 23 | U | 1200 | 1.8 | 191 | 5.1 | 16.4 | 11.6 | 70.8 |
| Comp. Ex. 13 | 0.96 | 28 | V | 1200 | 1.3 | 243 | 6.4 | 16.8 | 11.0 | 65.7 |
| Comp. Ex. 14 | 0.48 | 2.6 | W | 1200 | 2.6 | 38 | 4.9 | 16.3 | 11.4 | 70.3 |
| Comp. Ex. 15 | 0.97 | 10 | X | 1200 | 2.8 | 47 | 8.0 | 17.8 | 12.5 | 70.2 |
| Comp. Ex. 16 | 0.10 | 3.9 | Y | 1200 | 4.4 | 66 | 2.2 | 14.8 | 10.5 | 71.1 |
| Comp. Ex. 17 | 0.19 | 28 | Z | 1200 | 3.7 | 235 | 2.1 | 14.9 | 10.4 | 70.0 |
| Comp. Ex. 18 | 0.67 | 12 | R | 1400 | 3.9 | 30 | 4.2 | 15.9 | 11.0 | 69.3 |
| Comp. Ex. 19 | 0.67 | 12 | R | 1600 | 3.3 | 24 | 8.1 | 9.8 | 6.8 | 68.9 |
| Comp. Ex. 20 | 0.67 | 12 | R | 1800 | 2.2 | 19 | 9.8 | 9.2 | 6.4 | 69.9 |
| Comp. Ex. 21 | 0.45 | 12 | K | 850 | 3.4 | 178 | 1.5 | 8.2 | 3.0 | 37.0 |
| Comp. Ex. 22 | 0.45 | 12 | K | 1600 | 2.5 | 71 | 9.1 | 10.3 | 9.6 | 93.4 |

Table 1 shows the physical properties of the obtained amorphous carbon materials, including "a signal intensity ratio" obtained by the ESR measurement (a relative signal intensity ratio ($I_{4.8K}/I_{40K}$) of signal intensity ($I_{4.8K}$) of the spectrum at temperature of 4.8 K to signal intensity ($I_{40K}$) at temperature of 40K), "a line width ΔHpp" (a line width of the spectrum calculated from a first-order derivative spectrum at temperature of 4.8 K), and "Lc (002)" (a size of a crystallite in c-axis direction calculated from a (002) diffraction line of the amorphous carbon material measured by powder X-ray diffractometry).

Table 1 further shows "discharge capacity (mAh)" at the first cycle," "discharge capacity (mAh) at the 2,000th cycle" and "capacity maintenance ratio after 2,000 cycles (%)".

The amorphous carbon materials obtained by the producing methods described in Examples 1 to 11 had all of the features recited in the first aspect of the present invention: a size of a crystallite Lc (002) in c-axis direction ranging from 2.0 to 8.0 nm, the size being calculated from a (002) diffraction line of the amorphous carbon material measured by powder X-ray diffractometry; a carbon-derived spectrum appearing in a range from 3,200 to 3,400 gauss (G) in an electron spin resonance measured using X band; a relative signal intensity ratio ($I_{4.8}K/I_{40}K$) of the spectrum ranging from 2.4 to 3.5, wherein the relative signal intensity ratio is a ratio of signal intensity ($I_{4.8K}$) at temperature of 4.8 K to signal intensity ($I_{40K}$) at temperature of 40K; and a line width (ΔHpp) of the spectrum ranging from 70 to 180 gauss (G), wherein the line width is calculated from a first-order derivative spectrum at temperature of 4.8 K. The batteries comprising these amorphous carbon materials as negative electrodes had the capacity maintenance ratio after 2,000 cycles of 89% or more. It is evident that such amorphous carbon materials can provide lithium ion secondary batteries having excellent life characteristics.

On the other hand, the amorphous carbon materials obtained by the production methods described in Comparative Examples 1 to 20 did not satisfy the features recited in claim 1 of the present invention: a carbon-derived spectrum appearing in the range from 3,200 to 3,400 gauss (G) in an electron spin resonance measured using X band; a relative signal intensity ratio ($I_{4.8K}/I_{40K}$) of the spectrum ranging from 2.4 to 3.5, wherein the relative signal intensity ratio is a ratio of signal intensity ($I_{4.8K}$) at temperature of 4.8 K to signal intensity ($I_{40K}$) at temperature of 40K; and a line width (ΔHpp) of the spectrum ranging from 70 to 180 gauss (G), wherein the line width is calculated from a first-order derivative spectrum at temperature of 4.8 K. It is considered that the lithium ion secondary batteries comprising these amorphous carbon materials as negative electrodes are apt to generate a decomposition reaction of electrolyte solution at the negative electrode, thereby increasing leak current at the negative electrode so that a difference in leak currents between the negative and positive electrodes increases. As a result, the operation range of the capacity of the positive and negative electrodes is changed and life characteristics are lowered.

It can be said based on these results that in order to produce a lithium ion secondary battery achieving a high storage characteristic, having the capacity maintenance ratio of 89% or more after 2,000 cycles, it has to have the following features: a carbon-derived spectrum appearing in the range from 3,200 to 3,400 gauss (G) in an electron spin resonance measured using X band; a relative signal intensity ratio ($I_{4.8K}/I_{40K}$) of the spectrum ranging from 2.4 to 3.5, wherein the relative signal intensity ratio is a ratio of signal intensity ($I_{4.8K}$) at temperature of 4.8 K to signal intensity ($I_{40K}$) at temperature of 40K; and a line width ($\Delta Hpp$) of the spectrum ranging from 70 to 180 gauss (G), wherein the line width is calculated from a first-order derivative spectrum at temperature of 4.8 K.

In Comparative Example 21, Raw Coke K produced using a stock oil composition having the features recited in the second aspect of the present invention was pulverized, classified, and subjected to carbonization to 850° C. The amorphous carbon material (in Example 5) obtained by pulverization and classification of the same Raw Coke K, and subsequent carbonization at 1,200° C., had the size of a crystallite Lc(002) of 4.5 nm, while the amorphous carbon material (in Comparative Example 21) treated at 850° C. had the size of 1.5 nm.

Lithium ion secondary batteries comprising these amorphous carbon materials as negative electrodes had the discharge capacity at the first cycle of a high value of 16.1 mAh in Example 5, while a low value of 8.2 mAh in Comparative Example 21. It is considered that in Comparative Example 21, irreversible capacity at the initial charge/discharge cycle is large, thereby decreasing discharge capacity at the first cycle.

Further, the capacity maintenance ratio has a very high value of 91.7% in Example 5, while it has a very low value of 37.0% in Comparative Example 21. It is considered that a decomposition reaction of electrolyte solution at the negative electrode is apt to take place in Comparative Example 21, thereby increasing leak current at the negative electrode so that a difference in leak currents between the negative and positive electrodes increases. As a result, the operation range of the capacity of the positive and negative electrodes is changed and life characteristics are lowered.

In Comparative Example 22, Raw Ccoke K produced using a stock oil composition having the features recited in the second aspect of the present invention was pulverized, classified, and subjected to carbonization at 1,600° C. Although the amorphous carbon material (in Example 5) obtained by pulverization and classification of the same Raw Coke K, and subsequent carbonization at 1,200° C., had the size of a crystallite Lc (002) of 4.5 nm, the amorphous carbon material (in Comparative Example 22) treated at 1,600° C. had the size of 9.1 nm.

Lithium ion secondary batteries comprising these amorphous carbon materials as negative electrodes had very high values of the capacity maintenance ratio of more than 91% in both of Example 5 and Comparative Example 22. However, the discharge capacity at the 2,000th cycle was 14.7 mAh in Example 5, while it was 9.6 mAh in Comparative Example 22. The amorphous carbon material obtained in Comparative Example 22 can potentially provide a battery having a very high degree of cycle stability. However, the amorphous carbon material obtained by Comparative Example 22 has the Lc (002) of larger than 8.0 nm, so that it can provide only a small capacity battery. Thus, it is not preferable.

It can be said that, since discharge capacity of amorphous carbon material (material heat-treated at a temperature of the graphitization initiation temperature or lower) typically tends to decrease as the crystallite size Lc (002) increases, the same tendency is merely found in Comparative Example.

It can be understood based on these results that, in order to secure 14 mAh for the discharge capacity at the 2,000th cycle of a battery of this size, the size Lc (002) of crystallite of an amorphous carbon material used for a negative electrode has to be at least in the range of 2.0 to 8.0 nm.

It can be said based on these results that in order to produce a lithium ion secondary battery achieving a high storage characteristics, an amorphous carbon material used for the negative electrode have to have, as physical properties, the following features: a size of a crystallite Lc (002) in c-axis direction ranging from 2.0 to 8.0 nm, the size being calculated from a (002) diffraction line of the amorphous carbon material measured by powder X-ray diffractometry; a carbon-derived spectrum appearing in a range from 3,200 to 3,400 gauss (G) in an electron spin resonance measured using X band; a relative signal intensity ratio ($I_{4.8K}/I_{40K}$) of the spectrum ranging from 2.4 to 3.5, wherein the relative signal intensity ratio is a ratio of signal intensity ($I_{4.8K}$) at temperature of 4.8 K to signal intensity ($I_{40K}$) at temperature of 40K; and a line width ($\Delta Hpp$) of the spectrum ranging from 70 to 180 gauss (G), wherein the line width is calculated from a first-order derivative spectrum at temperature of 4.8 K.

The stock oil compositions used in the production methods described in Examples 1 to 11 had, as physical properties, the features recited in the second aspect of the present invention, i.e., having a normal paraffin content of 5 to 20% by weight and an aromatic index fa of 0.3 to 0.65. These stock oil compositions were subjected to coking to obtain Raw Cokes (E, F, G, J, K, L, O, P, Q). To obtain amorphous carbon materials, the Raw Cokes were pulverized and classified to obtain raw coke powders, and then subjected to carbonization, or the Raw Cokes were subjected to calcination at 1,400° C. to obtain calcined cokes and then pulverized and classified. The batteries comprising the amorphous carbon materials as their negative electrodes had the capacity maintenance ratio of 89% or more after 2,000 cycles. It is evident that a lithium ion secondary battery having excellent life characteristics can be provided.

On the other hand, the stock oil compositions used in the production methods described in Comparative Examples 1 to 17 did not have, as physical properties, the features recited in the second aspect of the present invention. These stock oil compositions were subjected to coking to obtain Raw Cokes. The Raw Cokes were pulverized and classified, and then subjected to carbonization to obtain amorphous carbon materials. Lithium ion secondary batteries comprising these amorphous carbon materials are apt to generate a decomposition reaction of electrolyte solution at the negative electrode, so that the operation range of the positive and negative electrodes is apt to be changed. The batteries are further apt to generate coating film of a decomposition reaction product at the edge faces of the negative electrodes, thereby increasing a resistive component in the reversible intercalation reaction of Li ions so that internal resistance of the batteries is increased and the life characteristics are unfavorably lowered.

The stock oil compositions used in the production methods described in Comparative Examples 18 to 20 did not have, as physical properties, the features recited in the second aspect of the present invention. Raw Coke R obtained using these stock oil compositions as raw materials, was subjected to calcination at 1,400° C. (in Comparative Example 18), at 1,600° C. (in Comparative Example 19) and at 1,800° C. (in Comparative Example 20), to obtain calcined cokes. The obtained calcined cokes were pulverized and classified to obtain amorphous carbon materials. The obtained amorphous carbon materials had a line width ΔHpp obtained from the ESR spectrum of 30 (in Comparative Example 18), 24 (in Comparative Example 19) and 19 (in Comparative Example 20), which were smaller than the range recited in the first aspect of the present invention. Each of the stock oil compositions used in Comparative Examples 18 to 20 had a larger aromatic index fa than the range recited in the second aspect of the present invention. Calcination of raw cokes obtained from these stock oil compositions forms huge anisotropic regions, so that there are fewer gap regions between the anisotropic regions. It is considered that when such calcined cokes are pulverized and classified, they have their planar hexagonal networks cut by mechanical energy applied, thereby exposing edge faces in an aligned state on the particle surfaces. It is considered that the lithium ion secondary battery comprising the amorphous carbon material as the negative electrode generates a decomposition reaction product of electrolyte solution at the edge faces exposed on the particle surfaces of the negative electrode, thereby forming coating film so that a resistive component in the reversible intercalation reaction of Li ions increases and internal resistance of the battery is increased. As a result, life characteristics of the battery are lowered.

It can be said based on these results that in order to produce a lithium ion secondary battery achieving a high storage characteristics, having a capacity maintenance ratio of 89% or more after 2,000 cycles, the stock oil composition comprised as a negative electrode of the lithium ion secondary battery have to have, as physical properties, the features recited in the second aspect of the present invention: normal paraffin content of 5 to 20% by weight and an aromatic index fa of 0.3 to 0.65.

In Examples 1 to 9, Raw Cokes described in Table 1 were pulverized and classified, and then subjected to carbonization to obtaining amorphous carbon materials. In Examples 10 and 11, Raw Cokes were subjected to carbonization at 1,400° C. to obtain calcined cokes, and then pulverized and classified to obtain amorphous carbon materials. Differences in physical properties of amorphous carbon materials between the former method and the latter method and differences in characteristics of lithium ion secondary batteries comprising these materials can be explained by comparing the results of Examples 5 and 10 using the same Raw Coke K as the raw materials. The amorphous carbon material obtained by pulverizing and classifying the carbonized calcined coke had the line width ΔHpp of 102 (in Example 10), while the amorphous carbon material obtained by pulverizing and classifying the Raw Coke and subjecting to carbonization had a large value of the line width ΔHpp of 119 (in Example 5). It can be said from this that an amorphous carbon material obtained by pulverizing and classifying the calcined coke has relatively fewer states of edge faces exposed on the particle surfaces.

A size of the anisotropic regions is relatively largely grown in calcined coke heat-treated at 1,400° C. compared with that in raw coke. When such calcined coke is pulverized and classified, cracks are apt to take place at the planar hexagonal networks in the anisotropic regions due to mechanical energy applied during pulverization and classification. It is considered that edges in a relatively aligned state are exposed on the crack faces introduced to the planar hexagonal networks oriented in one direction, thereby decreasing the states of edge faces exposed on the particle surfaces.

It is considered that, the amorphous carbon material obtained by pulverizing and classifying calcined coke as in Example 10 has a smaller line width ΔHpp based on the ESR spectrum, and the edge faces exposed on the particle surfaces are in a relatively aligned state, in comparison with the amorphous carbon material obtained by pulverizing and classifying raw cokes, and then subjecting to carbonization as in Example 5, Thus, although the capacity maintenance ratio (91.0%) in Example 10 was slightly lower than the capacity maintenance ratio (91.7%) in Example 5, very high capacity maintenance ratios were shown in both of Examples 5 and 10 because the stock oil compositions having, as physical properties, the features recited in the present invention were used as raw materials.

In each of Examples, a manganese-based substance containing a small amount of aluminum was used as an active material of the positive electrode, and worked stably to the end. Accordingly, it is evident that such active material is suitable for amorphous carbon materials of the present invention.

The present lithium ion secondary battery comprising the amorphous carbon material of the present invention can secure a high degree of storage characteristics in comparison with a conventional lithium secondary battery comprising a conventional amorphous carbon material. Accordingly, the present lithium ion secondary battery is applicable to vehicles, more specifically hybrid vehicles, plug-in hybrid vehicles and electric vehicles as well as to industry such as electricity storage for electric system infrastructure.

DESCRIPTION OF REFERENCE NUMERALS

11 Negative electrode
12 Negative electrode collector
13 Positive electrode
14 Positive electrode collector
15 Separator
16 Aluminum laminate outer casing

The invention claimed is:
1. An amorphous carbon material for a negative electrode of a lithium ion secondary battery, the material comprising:
  a size of a crystallite Lc(002) in c-axis direction ranging from 2.0 to 8.0 nm, the size being calculated from a (002) diffraction line of the amorphous carbon material measured by powder X-ray diffractometry;
  a carbon-derived spectrum appearing in a range from 3,200 to 3,400 gauss (G) in an electron spin resonance measured using X band;
  a relative signal intensity ratio ($I_{4.8K}/I_{40K}$) of the spectrum ranging from 2.4 to 3.5, wherein the relative signal intensity ratio is a ratio of signal intensity ($I_{4.8K}$) at temperature of 4.8 K to signal intensity ($I_{40K}$) at temperature of 40K; and
  a line width (ΔHpp) of the spectrum ranging from 70 to 180 gauss (G), wherein the line width is calculated from a first-order derivative spectrum at temperature of 4.8 K.

2. The amorphous carbon material for a negative electrode of a lithium ion secondary battery according to claim 1, the material having been produced by a method comprising a step of coking a stock oil composition by delayed coking process and a subsequent step of heating,
  wherein the stock oil composition has normal paraffin content of 5 to 20% by weight, and has an aromatic index fa represented by the following Equation 1 in a range of 0.3 to 0.65:

$$fa = 3.65 \times D - 0.00048H - 2.969 \qquad \text{(Equation 1)}$$

wherein $H = 875 \times [\log\{\log(V+0.85)\}]$, and D denotes density of the stock oil composition (g/cm$^3$), and V denotes viscosity of the stock oil composition (mm$^2$/sec.).

3. A lithium ion secondary battery comprising the amorphous carbon material according to claim 1 as a negative electrode material.

4. The lithium ion secondary battery according to claim 3, further comprising a non-aqueous electrolyte and a positive electrode comprising lithium capable of reversible intercalation of the lithium.

5. A lithium ion secondary battery comprising the amorphous carbon material according to claim 2 as a negative electrode material.

6. The lithium ion secondary battery according to claim 5, further comprising a non-aqueous electrolyte and a positive electrode comprising lithium capable of reversible intercalation of the lithium.

* * * * *